United States Patent
Kataoka et al.

(10) Patent No.: US 10,957,076 B2
(45) Date of Patent: Mar. 23, 2021

(54) NON-TRANSITORY COMPUTER READABLE RECORDING MEDIUM, STORAGE CONTROL METHOD, EXTRACTION METHOD, STORAGE CONTROL DEVICE, AND EXTRACTION DEVICE

(71) Applicant: FUJITSU LIMITED, Kawasaki (JP)

(72) Inventors: Masahiro Kataoka, Kamakura (JP); Ryouta Komatsu, Yokohama (JP); Iori Murakami, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 16/253,933

(22) Filed: Jan. 22, 2019

(65) Prior Publication Data

US 2019/0236811 A1    Aug. 1, 2019

(30) Foreign Application Priority Data

Jan. 31, 2018   (JP) .............................. JP2018-015600

(51) Int. Cl.
  *G06T 9/40*   (2006.01)
  *H04N 1/40*   (2006.01)
  *G06K 9/00*   (2006.01)

(52) U.S. Cl.
  CPC ............ *G06T 9/40* (2013.01); *G06K 9/00463* (2013.01); *H04N 1/40062* (2013.01)

(58) Field of Classification Search
  CPC ..... G06T 9/40; G06T 3/4007; G06K 9/00463; H04N 1/40062
  See application file for complete search history.

(56) References Cited

U.S. PATENT DOCUMENTS

| | | | |
|---|---|---|---|
| 6,404,901 B1 * | 6/2002 | Itokawa | G06T 7/223 382/103 |
| 2003/0123729 A1 | 7/2003 | Mukherjee et al. | |
| 2006/0269151 A1 | 11/2006 | Sakuyama | |
| 2013/0135454 A1 * | 5/2013 | Ito | H04N 5/23212 348/77 |
| 2014/0064625 A1 * | 3/2014 | Kim | G06K 9/48 382/203 |
| 2014/0086504 A1 * | 3/2014 | Arai | H04N 19/88 382/246 |
| 2016/0295036 A1 * | 10/2016 | Momoki | G06K 9/00671 |
| 2017/0213376 A1 * | 7/2017 | Li | G06T 3/4007 |

FOREIGN PATENT DOCUMENTS

| | | |
|---|---|---|
| JP | 2005-516553 | 6/2005 |
| JP | 2007-005844 | 1/2007 |
| JP | 2014-063376 | 4/2014 |

* cited by examiner

*Primary Examiner* — Myron Wyche
(74) *Attorney, Agent, or Firm* — Fujitsu Patent Center

(57) ABSTRACT

A storage control device specifies, based on association information, blocks in each of which the boundary is included from among a plurality of blocks. The storage control device generates, for each of the specified blocks, first image data and second image data. The first image data is image data that includes a first object and that does not include a second object, whereas the second image data is image data that includes a second object. The storage control device stores the generated first image data and the second image data in a storage unit so as to be identifiable.

14 Claims, 22 Drawing Sheets

| LEAF (DITHER IMAGE DATA) | CODE |
|---|---|
| DITHER IMAGE DATA IN BLOCK 10-11 | CODE γ 11-11 |
| FRONT DITHER IMAGE DATA IN BLOCK 10-12 | CODE α 11-12 |
| ... | ... |
| FRONT DITHER IMAGE DATA IN BLOCK 10-32 | CODE α 11-32 |
| REAR DITHER IMAGE DATA IN BLOCK 10-32 | CODE β 11-32 |
| ... | ... |
| DITHER IMAGE DATA IN BLOCK 10-45 | CODE γ 11-45 |

140c

```
newpath
Xa Ya moveto
Xb Yb lineto
Xα Yα Xβ Yβ Xc Yc curveto
Xd Yd lineto
Xa Ya lineto
stroke
showpge
```

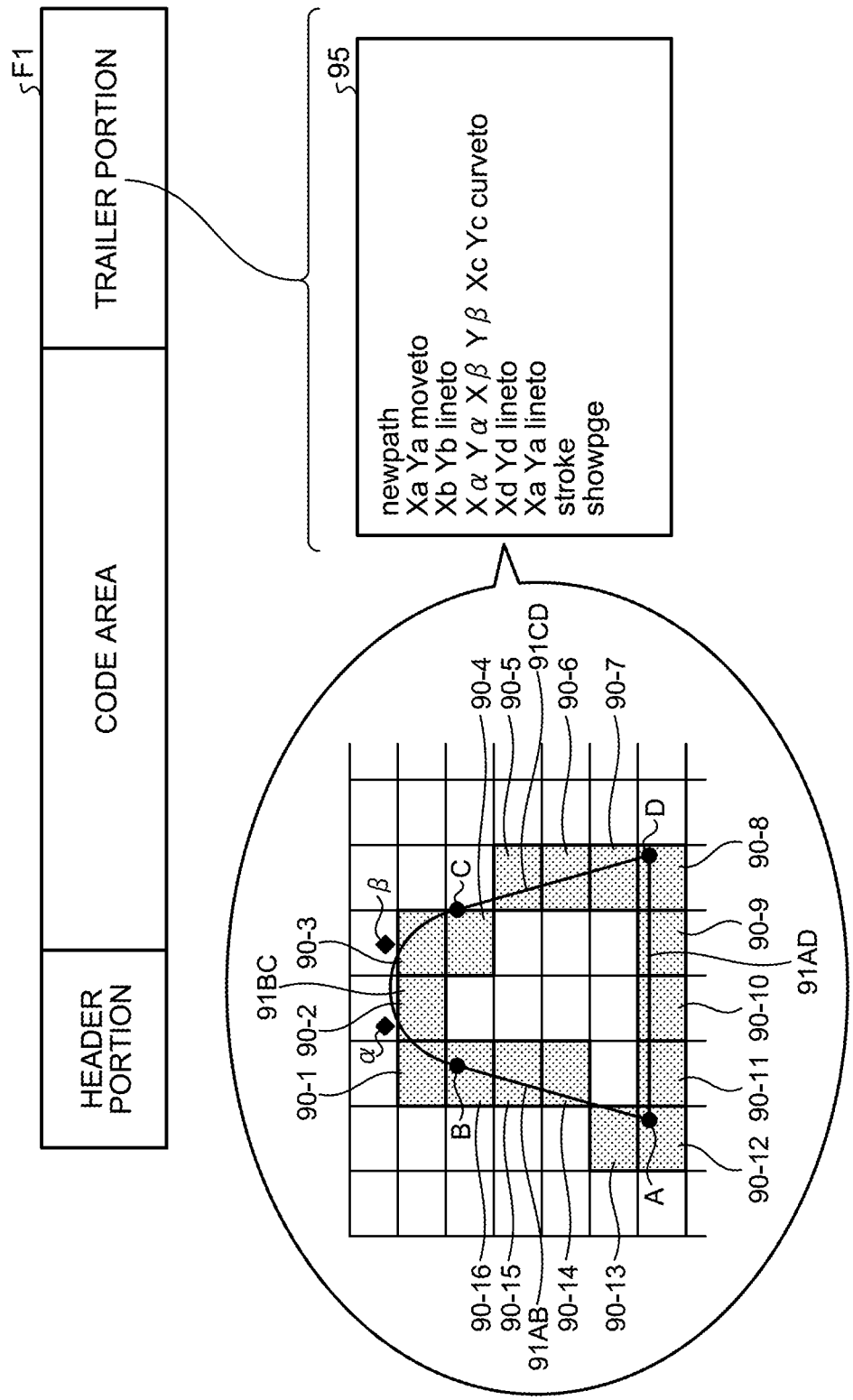

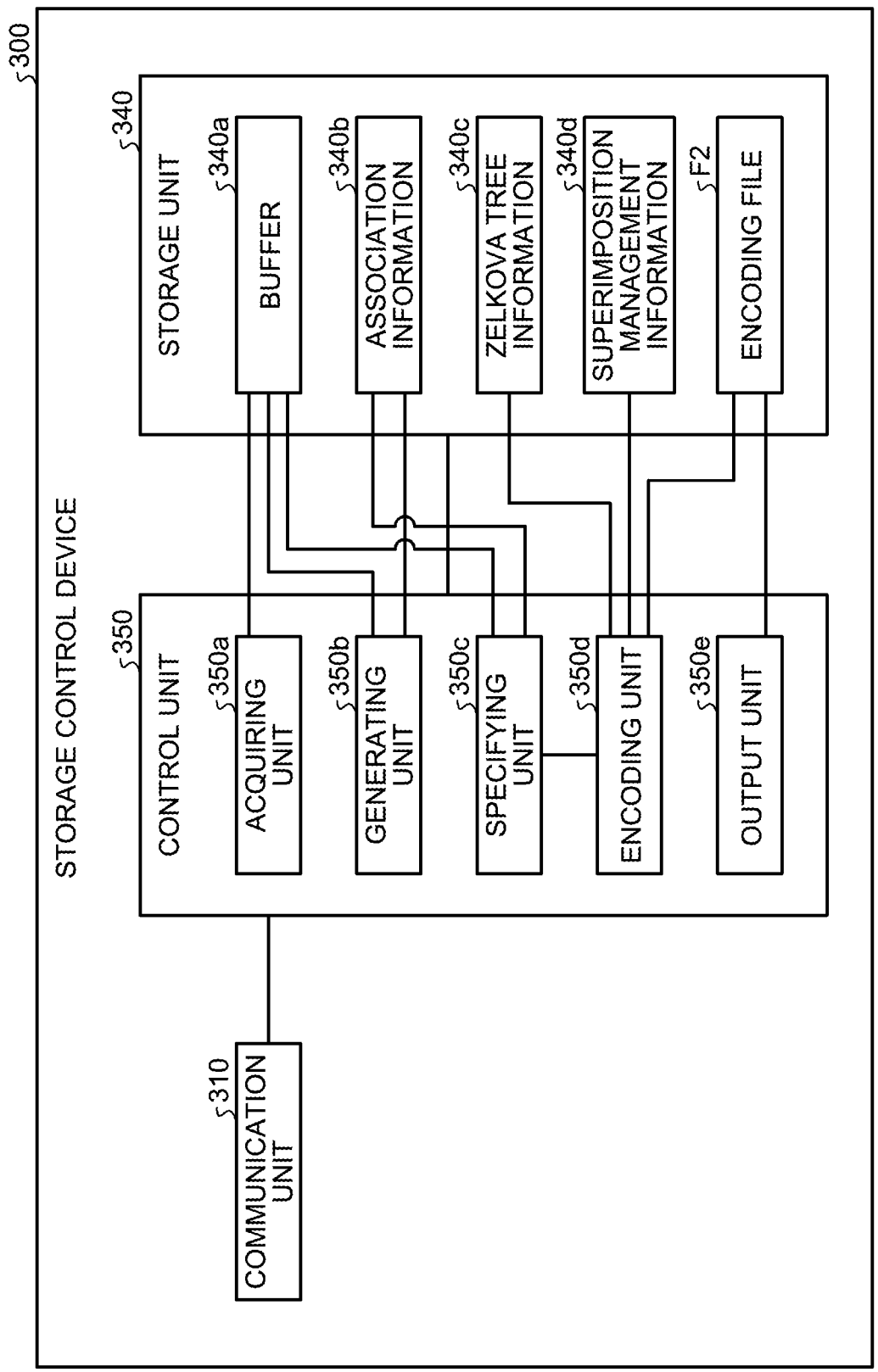

| LEAF (DITHER IMAGE DATA) | CODE |
|---|---|
| DITHER IMAGE DATA IN BLOCK 60-11 | CODE $\gamma$61-11 |
| DITHER IMAGE DATA IN BLOCK 60-12 | CODE $\gamma$61-12 |
| ... | ... |
| DITHER IMAGE DATA IN BLOCK 60-32 | CODE $\gamma$61-32 |
| ... | ... |
| DITHER IMAGE DATA IN BLOCK 60-45 | CODE $\gamma$61-45 |

| SUPERIMPOSITION INFORMATION | CODE |
|---|---|
| SUPERIMPOSITION INFORMATION (ALL PIXEL VALUES ARE 0) | CODE $\delta$61 |
| SUPERIMPOSITION INFORMATION ON BLOCK 60-12 | CODE $\delta$61-12 |
| SUPERIMPOSITION INFORMATION ON BLOCK 60-13 | CODE $\delta$61-13 |
| ... | ... |
| SUPERIMPOSITION INFORMATION ON BLOCK 60-44 | CODE $\delta$61-44 |

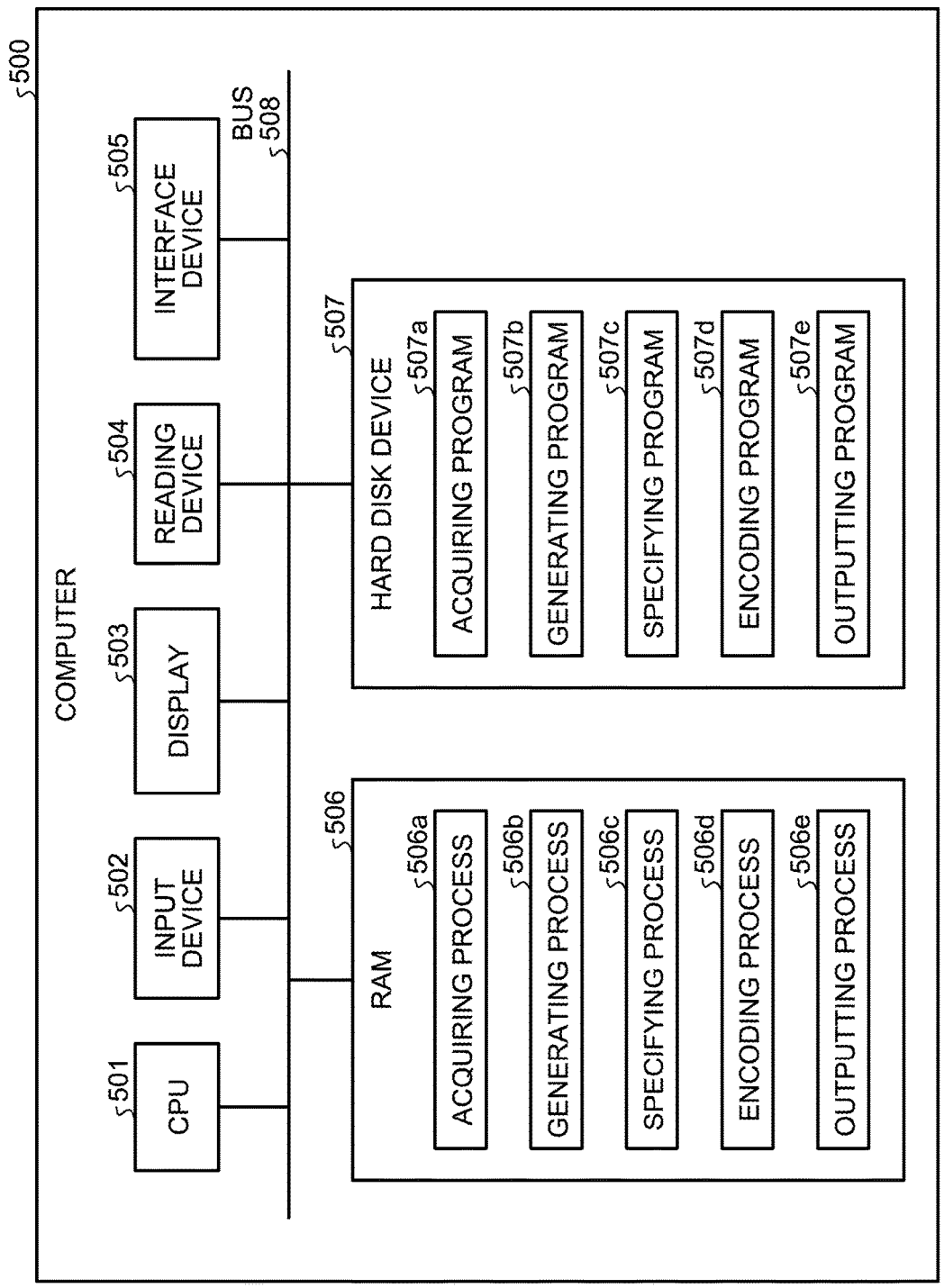

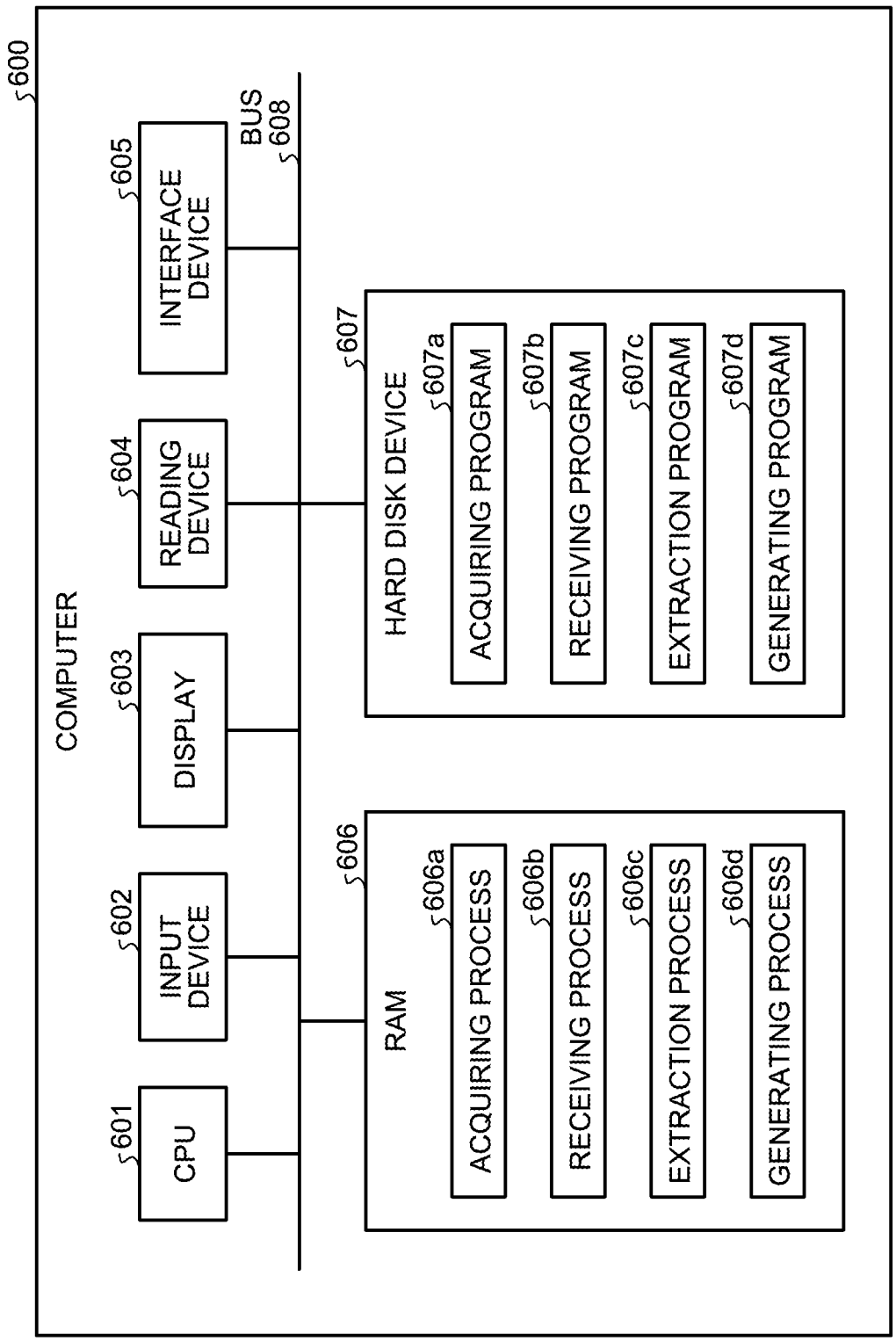

NON-TRANSITORY COMPUTER READABLE RECORDING MEDIUM, STORAGE CONTROL METHOD, EXTRACTION METHOD, STORAGE CONTROL DEVICE, AND EXTRACTION DEVICE

CROSS-REFERENCE TO RELATED APPLICATION

This application is based upon and claims the benefit of priority of the prior Japanese Patent Application No. 2018-015600, filed on Jan. 31, 2018, the entire contents of which are incorporated herein by reference.

FIELD

The embodiments discussed herein are related to a computer-readable recording medium and the like.

BACKGROUND

In conventional technologies related to an image analysis, an analysis that uses probability models is performed based on captured images compressed by Joint Photographic Experts Group (JPEG) or the like. For example, among the conventional technologies, there is a technology that is used to recognize an object included in a captured image by performing maximum likelihood estimation based on an expectation-maximization (EM) algorithm or the like and by using probabilistic region segmentation or probabilistic edge detection.

Patent Document 1: Japanese National Publication of International Patent Application No. 2005-516553
Patent Document 2: Japanese Laid-open Patent Publication No. 2007-005844
Patent Document 3: Japanese Laid-open Patent Publication No. 2014-063376

SUMMARY

According to an aspect of an embodiment, a storage control method including: receiving a captured image and association information associated with each of a plurality of blocks, the association information indicating whether a boundary between a first object and a second object is included in each of the plurality of blocks included in the captured image, wherein a distance from the first object to an image capturing position of the captured image is different from a distance from the second object to the image capturing position; specifying the blocks in which the boundary is included from among the plurality of blocks based on the association information; generating first image data that includes the first object but does not include the second object and that is associated with the specified blocks based on image data associated with the specified blocks included in the received captured image and second image data that includes the second object and that is associated with the specified blocks based on image data associated with the specified blocks included in the received captured image; and storing the first image data and the second image data in a storage unit so as to be identifiable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9C is a diagram illustrating an example in which the PostScript data is stored;

FIG. 15 is a diagram illustrating a configuration of the storage control device according to the second embodiment;

FIG. 16 is a diagram illustrating a data structure of Zelkova tree information according the second embodiment;

FIG. 17 is a diagram illustrating a data structure of superimposition management information according to the second embodiment;

FIG. 21 is a diagram illustrating an example of a hardware configuration of a computer that implements the same function as that performed by the storage control device; and FIG. 22 is a diagram illustrating an example of a hardware configuration of a computer that implements the same function as that performed by the extraction device.

DESCRIPTION OF EMBODIMENTS

However, with the conventional technologies described above, it is not possible to generate information on an object included in a captured image that is easily and efficiently reused. Furthermore, with the conventional technologies described above, it is not possible to easily specify an outline of the object included in the captured image.

For example, in compression performed by using JPEG, priority is given to an increase in compression rate with respect to a captured image and thus it is not able to generate information that is related to an object included in a captured image and that is easily and efficiently reused. Furthermore, by using the EM algorithm, it is possible to perform probabilistic edge detection and detect the outline of the object; however, an analysis cost is high and it is not able to easily specify the outline of the object included in the captured image.

Preferred embodiments of the present invention will be explained with reference to accompanying drawings. Furthermore, the present invention is not limited to the embodiments.

[a] First Embodiment

Figure 1:
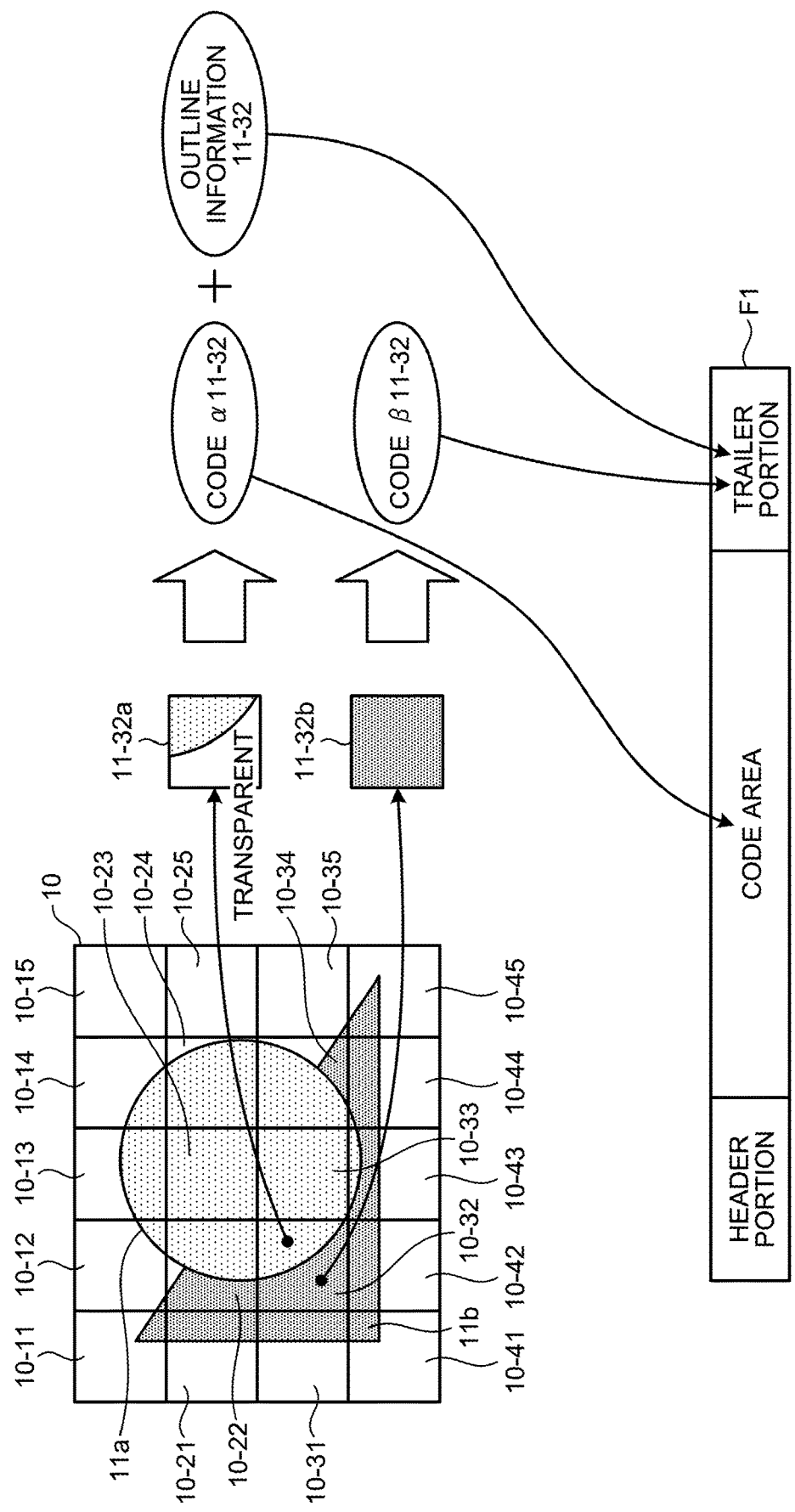
FIG. 1 is a diagram illustrating an example of a process performed by a storage control device according to a first embodiment.

FIG. 1 is a diagram illustrating an example of a process performed by a storage control device according to a first embodiment. As illustrated in FIG. 1, a storage control device acquires captured image data 10 that is a compression target. For example, the captured image data 10 is image data obtained by capturing an object 11a and an object 11b. In the example illustrated in FIG. 1, the object 11a is located anterior to the object 11b.

The storage control device divides the captured image data into a plurality of blocks 10-11 to 10-45. The storage control device specifies, based on association information, from among the plurality of blocks 10-11 to 10-45, the blocks that include the boundary between each of the objects or that include the outline of the target object.

The association information is information indicating the blocks that include the boundary between each of the objects or the outline of the target object. Furthermore, the association information includes, in a block area, information on an area of the target object and information on another area. In the first embodiment, as an example, a description will be given with the assumption that the target object is the object 11a.

In a description below, when particularly distinguishing the blocks, the blocks that include the boundary between each of the objects or that include the outline of the target object is referred to as "first type blocks". Furthermore, the blocks that do not include the boundary between each of the objects and that do not include the outline of the target object is referred to as "second type blocks".

In the example illustrated in FIG. 1, the first type blocks correspond to blocks 10-12, 10-13, 10-14, 10-22, 10-24, 10-32, 10-34, 10-43, and 10-44. The other blocks that do not correspond to the first type blocks correspond to the second type blocks.

In the following, an example of a process in which the storage control device encodes (compresses) the first type blocks will be described. Here, a process in which the storage control device encodes the block 10-32 will be described.

The storage control device generates, based on the block 10-32, front dither image data 11-32a and rear dither image data 11-32b.

The front dither image data 11-32a is image data that includes the object 11a and that does not include the object 11b. For example, the storage control device generates the front dither image data 11-32a by performing a process of leaving, in the area of the block 10-32, the area of the object 11a and allowing the other areas to be penetrated and by performing dithering on this processed block 10-32.

The rear dither image data 11-32b is image data that includes the object 11b. For example, the storage control device performs a process of correcting the pixel values of the area except for the area of the object 11a in the area of the block 10-32 by the pixel values of another area (for example, the area of the object 11b or a background). The storage control device generates the rear dither image data 11-32b by performing dithering on this processed block 11-32.

The storage control device assigns a code α11-32 to the front dither image data 11-32a and generates outline information 11-32. The outline information 11-32 is information that indicates the shape of the outline of the object 11a (or the boundary between the objects 11a and 11b) included in the front dither image data 11-32a and that is used to penetrate another area. Furthermore, the storage control device assigns a code β11-32 to the rear dither image data 11-32b.

The process in which the storage control device encodes the other first type blocks is the same as the process of encoding the block 10-32 described above. Namely, regarding each of the first type blocks, the storage control device generates the front dither image data and the rear dither image data, assigns codes, and generates the outline information.

In the following, an example of a process in which the storage control device encodes (compresses) the second type blocks will be described. Here, a process in which the storage control device encodes the block 10-11 will be described.

The storage control device generates dither image data 11-11 by performing dithering on the block 10-11 without processing anything. The storage control device assigns a code γ11-11 to the dither image data 11-11.

The process in which the storage control device encodes the other second type blocks is the same as the process of encoding the block 10-11 described above.

Here, the storage control device characterizes each of the codes such that the codes assigned to the front dither image data in the first type blocks and the codes assigned to the dither image data in the second type blocks can be identified. For example, the storage control device may also unify the top n bits of each of the codes to be assigned to the front dither image data by a predetermined bit string. Alternatively, the storage control device may also unify the top n bits of each of the codes of the dither image data in the second type blocks by a predetermined bit string.

The storage control device encodes, in a manner described above, each of the blocks 10-11 to 10-45 in accordance with a predetermined order that has previously been defined and then sequentially stores the codes and the outline information in the encoding file F1. For example, the encoding file F1 includes a header portion, a code area, and a trailer portion.

The header portion is an area for storing various kinds of control information. The code area is an area for storing the codes of the front dither image data and the codes of the dither image data included in the second type blocks. The trailer portion is an area for storing the outline information and the code of the rear dither image data.

Figure 2:
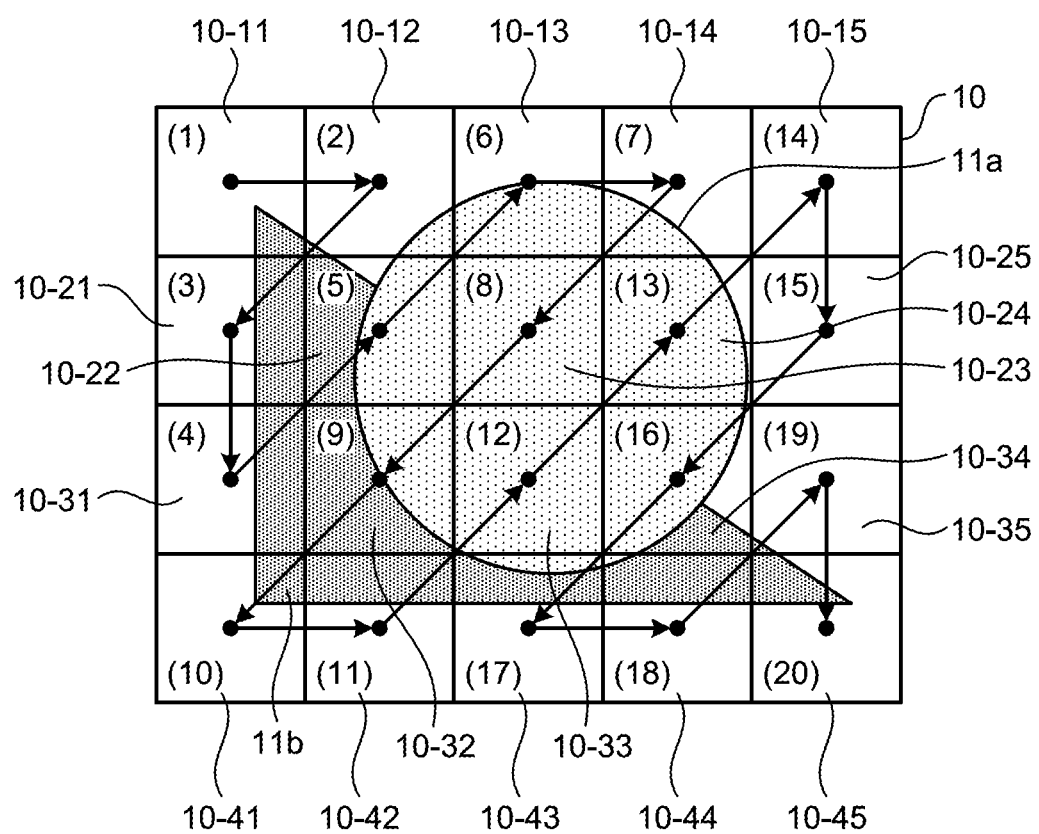
FIG. 2 is a diagram illustrating an example of the order of encoding performed by the storage control device according to the first embodiment.

FIG. 2 is a diagram illustrating an example of the order of encoding performed by the storage control device according to the first embodiment. Each of the blocks is encoded in the order illustrated in FIG. 2 and then the code assigned to each of the blocks is stored in the code area in this order. In the example illustrated in FIG. 2, the storage control device encodes each of the blocks in the order of zigzag scan. Specifically, the order of the encoding is in the order of the blocks 10-11, 10-12, 10-21, 10-31, 10-22, 10-13, 10-14, 10-23, 10-32, 10-41, 10-42, 10-33, 10-24, 10-15, 10-25, 10-34, 10-43, 10-44, 10-35, and 10-45.

For example, the storage control device encodes the block (the first type block) 10-32 for the ninth time. Consequently, the storage control device stores the code α11-32 assigned to the front dither image data associated with the block 10-32 in the ninth area in the code area.

It is assumed that, when the storage control device stores both the codes of the rear dither image data included in the first type blocks and the outline information in the trailer portion, the storage control device associates the subject first type blocks with the order in which the blocks were encoded. For example, the block (the first type block) 10-32 is encoded for the ninth time. Thus, the storage control device associates each of the order of "9", the code β11-32 that has been assigned to the rear dither image data, and the outline information 11-32 and then stores the assigned information in the trailer portion.

As described above, the storage control device divides the captured image data 10 into a plurality of blocks, scans the blocks in a predetermined order, encodes each of the blocks, and sequentially stores the codes in the code area in the encoding file F1 in the order in which the blocks were encoded. Here, if the blocks targeted for encoding are the first type blocks, the storage control device performs a process of assigning the codes that can be distinguished from the codes of the second type blocks, associating the outline information on the object included in the first type blocks with the order in which the blocks were encoded, and storing the associated information in the trailer portion. Consequently, it is possible to specify the blocks that include the outline of the object by scanning the code area without generating the captured image data 10 by decoding the codes stored in the code area and it is possible to easily recycling the outline (outline vector) of the object by acquiring the outline information that is associated with the specified blocks from the trailer portion.

Figure 3:
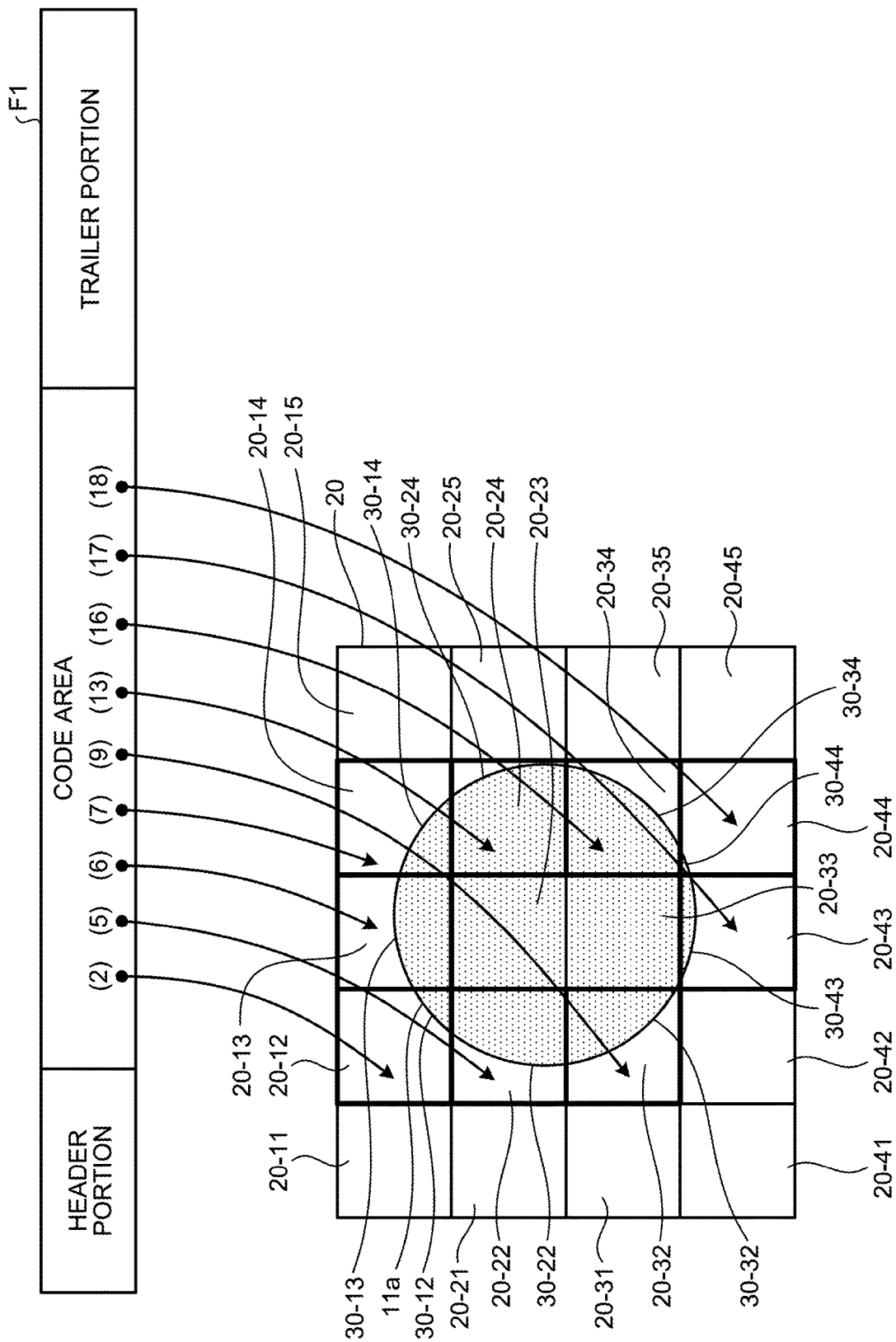
FIG. 3 is a diagram illustrating an example of a process performed by an extraction device according to the first embodiment.

In the following, a description will be given of an example of a process performed by an extraction device that extract an outline vector of an object based on the encoding file F1 generated by the storage control device described with reference to FIG. 1. FIG. 3 is a diagram illustrating an example of a process performed by the extraction device according to the first embodiment. For example, the extraction device generates extraction image data 20 and divides the extraction image data 20 into a plurality of blocks 20-11 to 20-45. It is assumed that the number of the blocks 20-11 to 20-45 is the same as the number of the blocks 10-11 to 10-45 in the captured image data 10 described with reference to FIG. 1.

The extraction device sequentially scans the code area in the encoding file F1 and specifies the codes assigned to the front dither image data included in the first type blocks. The extraction device specifies, from the blocks 20-11 to 20-45, the blocks that include the outline of the object 11a by using, as a key, the order in which the codes assigned to the front dither image data in the first type blocks were stored. For example, if it is assumed that the order in which the codes assigned to the front dither image data in the first type blocks were stored in the code area is the order of 2, 5, 6, 7, 9, 13, 16, 17, and 18 and if it is assumed that each of the blocks is encoded in the order described with reference to FIG. 2, the blocks that include the outline of the object 11a are the blocks 20-12, 20-13, 20-14, 20-22, 20-24, 20-32, 20-34, 20-43, and 20-44.

Furthermore, the extraction device acquires the outline information associated with the order of 2, 5, 6, 7, 9, 13, 16, 17, and 18 from the trailer portion and sets the outline included in each of the blocks. For example, the extraction device sets the pieces of outline information associated with the order of 2, 5, 6, 7, 9, 13, 16, 17, and 18 to the outlines 30-12, 30-22, 30-12, 30-14, 30-32, 30-24, 30-34, 30-43, and 30-44, respectively.

The extraction device extracts, as the outline vector of the object 11a, the outline that is a combination of the set outlines 30-12, 30-13, 30-14, 30-22, 30-24, 30-32, 30-34, 30-43, and 30-44.

In this way, the extraction device extracts the outline (outline vector) of the object by scanning the code area, specifying the blocks that include the outline of the object, and acquiring the outline information associated with the specified blocks from the trailer portion. In this process, it is possible to extract the outline of the object 11a without decoding the encoded information and performing edge detection by using the EM algorithm. Thus, with the extraction device, it is possible to easily specify the outline of the object included in the captured image.

Figure 4:
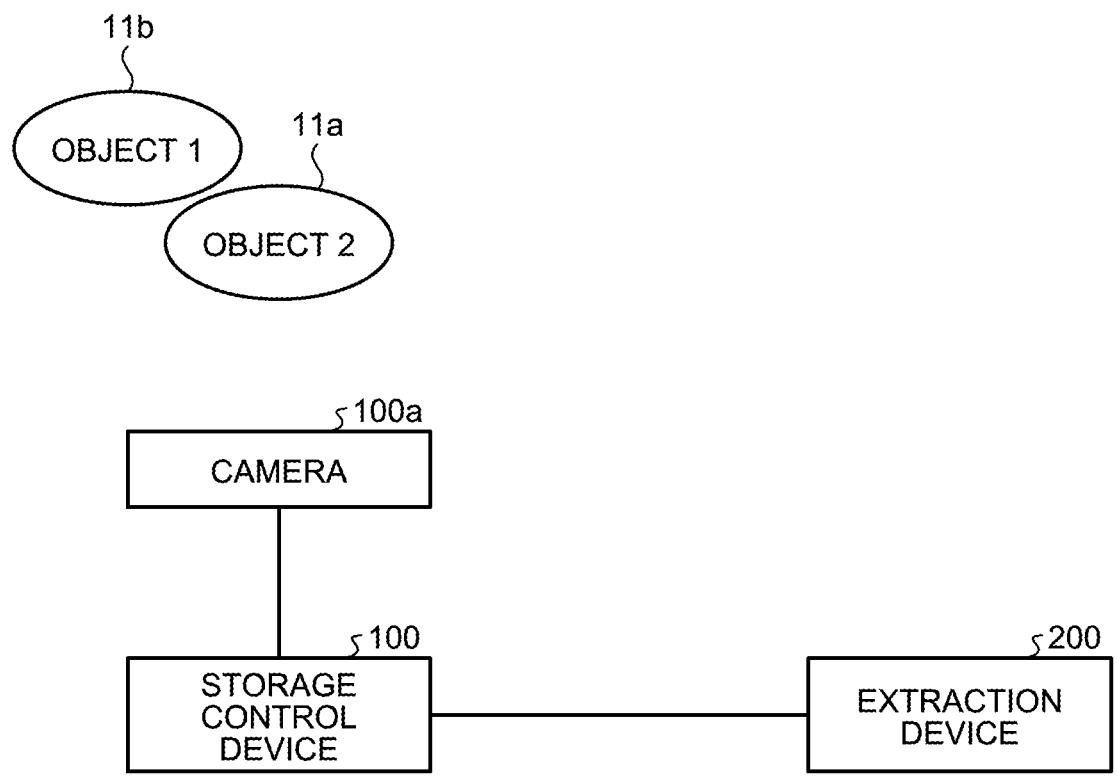
FIG. 4 is a diagram illustrating an example of a system according to the first embodiment.

In the following, an example of a system according to the first embodiment will be described. FIG. 4 is a diagram illustrating an example of the system according to the first embodiment. As illustrated in FIG. 4, the system includes a camera 100a, a storage control device 100, and an extraction device 200. The storage control device 100 is connected to the camera 100a and the extraction device 200. In the first embodiment, as an example, it is assumed that the object 11a and the object 11b are arranged in the capturing range of the camera 100a.

The camera 100a is a stereo camera (binocular camera) that simultaneously captures target objects (for example, the objects 11a and 11b) from two different directions or is a monocular camera that can move from side to side and that can identify the outline of the object based on parallax. The camera 100a outputs, to the storage control device 100, the first captured image data on an image captured from the first direction and the second captured image data on an image captured from the second direction that is different from the first direction.

The storage control device 100 is a device, as described in FIG. 1 and FIG. 2, that generates the encoding file F1 by dividing the captured image data 10 into a plurality of blocks and encoding each of the blocks. The storage control device 100 sends the encoding file F1 to the extraction device 200.

The extraction device 200 is a device, as described in FIG. 3, that scans the encoding file F1 and that extracts an outline vector. The extraction device 200 may also output the information on the extracted outline vector to a display device (not illustrated) or another device.

In FIG. 4, a description has been given of a case, as an example, in which the storage control device 100 and the extraction device 200 are different devices; however, the example is not limited to this. For example, the functions of the storage control device 100 and the extraction device 200 may also be held by a single server or the functions of the storage control device 100 and the extraction device 200 may also be implemented by a plurality of servers in cloud environments in cooperation with each other.

Figure 5:
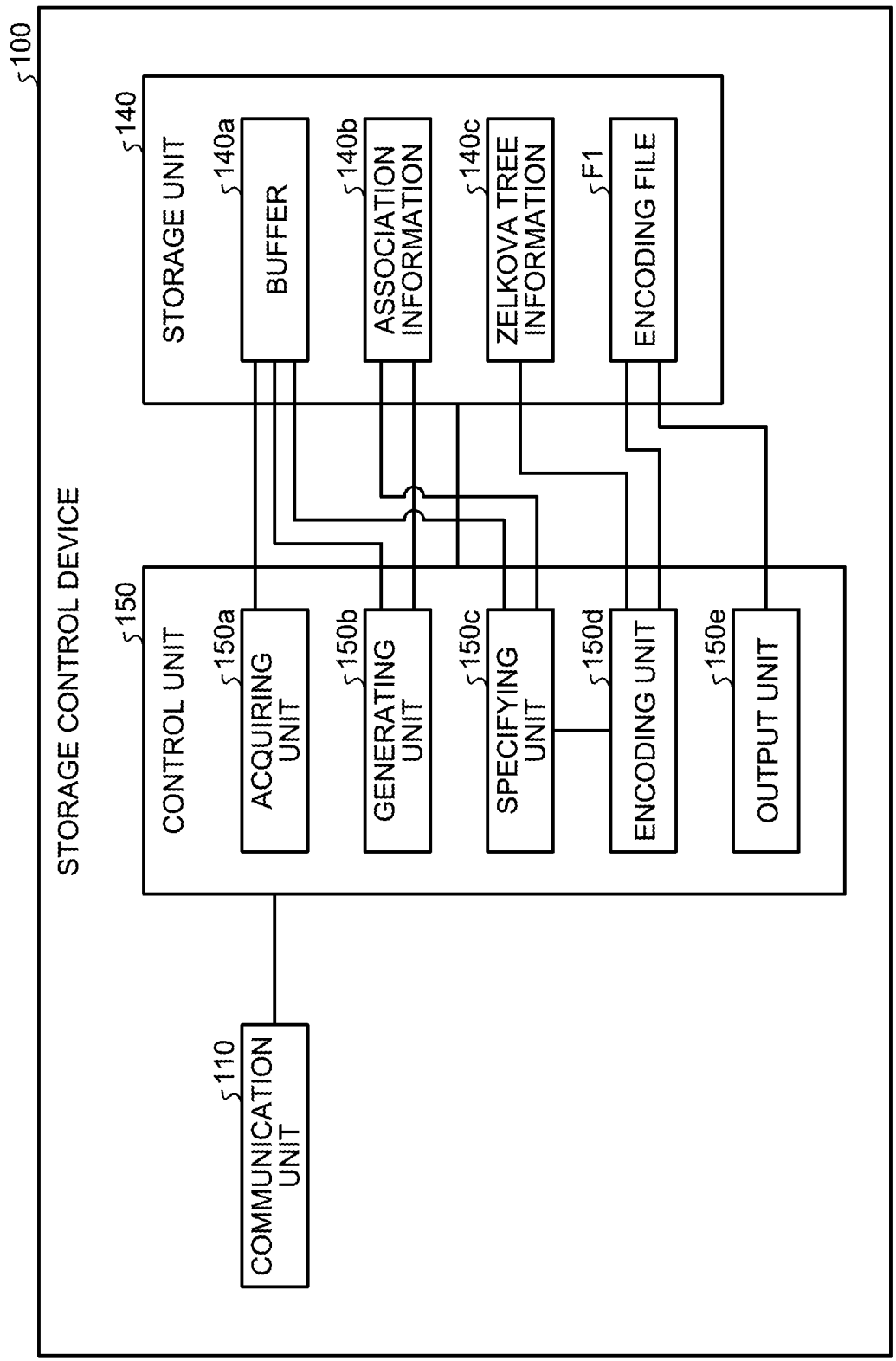
FIG. 5 is a diagram illustrating a configuration of the storage control device according to the first embodiment.

In the following, an example of a configuration of the storage control device 100 illustrated in FIG. 4 will be described. FIG. 5 is a diagram illustrating the configuration of the storage control device according to the first embodiment. As illustrated in FIG. 5, the storage control device 100 includes a communication unit 110, a storage unit 140, and a control unit 150. Although not illustrated, the storage control device 100 may also include an input device that inputs various kinds of information, a display device that displays information generated by the storage control device 100, and the like.

The communication unit 110 is a processing unit that performs data communication between the camera 100a and the extraction device 200. The communication unit 110 acquires the first captured image data and the second captured image data from the camera 100a. Furthermore, the communication unit 110 sends the information in the encoding file F1 generated by the storage control device 100 to the extraction device 200. For example, the communication unit 110 corresponds to a communication device. The control unit 150, which will be described later, sends and receives data to and from the camera 100a and the extraction device 200 via the communication unit 110.

The storage unit 140 includes a buffer 140a, association information 140b, Zelkova tree information 140c, and the encoding file F1. The storage unit 140 corresponds to a semiconductor memory device, such as a random access memory (RAM), a read only memory (ROM), and a flash memory, or a storage device, such as a hard disk drive (HDD).

The buffer 140a is a buffer that stores therein the first captured image data and the second captured image data on an image captured by the camera 100a.

The association information 140b includes information on the boundary between different objects included in the first captured image data or information on the outline of the object included in the first captured image data. For example, the information on the boundary or the outline corresponds to location information on the boundary and the outline included in the first captured image data.

Figures 6A, 6B:
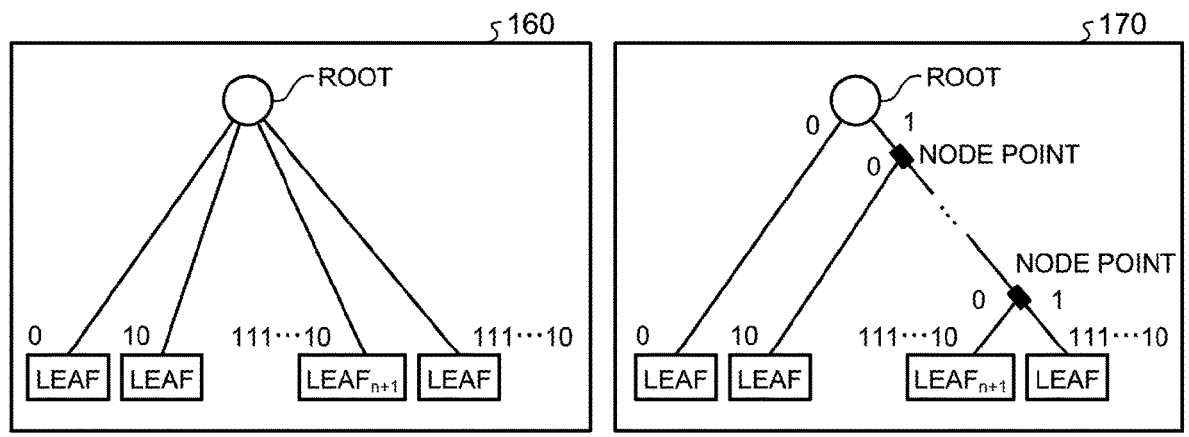
FIG. 6A is a diagram illustrating an example of a data structure of Zelkova tree information according to the first embodiment.
FIG. 6B is a diagram illustrating a Zelkova tree and a Huffman tree.

The Zelkova tree information 140c is dictionary information in which codes to be assigned to the dither image data are defined. FIG. 6A is a diagram illustrating an example of a data structure of the Zelkova tree information according to the first embodiment. As illustrated in FIG. 6A, the Zelkova tree information 140c associates leaves (dither image data) of the Zelkova tree with codes. The dither image data is dither image data that corresponds to either the front dither image data and the rear dither image data that are generated from the first type block or the dither image data that is generated from the second type block.

FIG. 6B is a diagram illustrating a Zelkova tree and a Huffman tree. As illustrated in FIG. 6B, a Zelkova tree 160 connects the assigned code to the leaf. Each of the leaves corresponds to the leaf (dither image data) illustrated in FIG. 6A. A Huffman tree 170 includes node points, whereas the Zelkova tree 160 does not include node points. The Zelkova tree 160 is obtained by improving the Huffman tree 170 so as not to have node points and is generated by aiming to increase the number of assigned codes and to speed up the process of specifying a leaf. The Zelkova tree 160 is also referred to as a neural tree.

The code indicates the code to be assigned to the associated dither image data. Furthermore, it is assumed that the code can be distinguished among the codes of the front dither image data, the codes of the rear dither image data, and the codes of the dither image data. In the first embodiment, as an example, α is added to the top of the code of the front dither image data; β is added to the top of the code of the rear dither image data; and γ is added to the top of the code of the dither image data included in the second type blocks.

The encoding file F1 corresponds to the encoding file F1 illustrated in FIG. 1.

The control unit 150 includes an acquiring unit 150a, a generating unit 150b, a specifying unit 150c, an encoding unit 150d, and an output unit 150e. The control unit 150 can be implemented by a central processing unit (CPU), a micro processing unit (MPU), or the like. Furthermore, the control unit 150 can also be implemented by hard-wired logic, such as an application specific integrated circuit (ASIC) or a field programmable gate array (FPGA).

The acquiring unit 150a is a processing unit that acquires, from the camera 100a, the first captured image data and the second captured image data. The acquiring unit 150a stores the acquired first captured image data and the second captured image data in the buffer 140a.

The generating unit 150b is a processing unit that generates the association information 140b based on both the first captured image data and the second captured image data stored in the buffer 140a. For example, the generating unit 150b recognizes each of the objects (for example, the objects 11a and 11b) included in the first captured image data based on the principle of the stereo matching performed by using the first captured image data and the second captured image data.

For example, the generating unit 150b uses the recognition result of the object 11a and the object 11b and specifies the boundary portion between the object 11a and the object 11b and the outline portion of the object 11a that are included in the first captured image. The generating unit 150b generates the location information on the boundary portion and the location information on the outline portion as the association information 140b and stores the association information 140b in the storage unit 140. Furthermore, the generating unit 150b may also selectively receive an object that becomes the extraction target of the outline portion from the input device.

The specifying unit 150c is a processing unit that divides the first captured image data into a plurality of blocks, that compares the plurality of divided blocks with the association information, and specifies the first type blocks that include the boundary or the outline and the second type blocks that do not include the boundary and the outline. The specifying unit 150c outputs, to the encoding unit 150d, the specified result and the information on the first captured image data that is divided into blocks.

For example, regarding each of the blocks, the specifying unit 150c compares the region of the block area with the location information on the boundary or the outline corresponding to the association information 140b. If the boundary or the outline is included in the region of the block area that is the comparison target, the specifying unit 150c sets the comparison target blocks to the first type blocks. In contrast, if the boundary and the outline are not included in the region of the block area that is the comparison target, the specifying unit 150c sets the comparison target blocks to the second type blocks.

The encoding unit 150d is a processing unit that encodes the first image data. In the following, the first captured image data encoded by the encoding unit 150d is simply referred to as captured image data. Furthermore, the captured image data is captured image data that is divided into a plurality of blocks by the specifying unit 150c.

The encoding unit 150d encodes each of the blocks in the predetermined order. For example, the encoding unit 150d encodes each of the blocks in the order of the zigzag scan in a similar way as each of the blocks of the captured image data 10 described in FIG. 2. The encoding unit 150d assigns codes to the blocks targeted for encoding and sequentially stores the assigned codes in the code area included in the encoding file F1. Here, the encoding unit 150d determines whether, based on the specified result obtained by the specifying unit 150c, the blocks targeted for encoding are the first type blocks or the second type blocks and performs encoding in accordance with the type of blocks.

An example of a process performed by the encoding unit 150d when the blocks targeted for encoding is the first type blocks will be described. The encoding unit 150d generates the front dither image data and the rear dither image data based on the first type blocks. Here, a process in which the encoding unit 150d encodes the block 10-32 that becomes the first type block will be described.

The encoding unit 150d generates the front dither image data 11-32a and the rear dither image data 11-32b based on the block 10-32. Descriptions related to the front dither image data 11-32a and the rear dither image data 11-32b are the same as those described in FIG. 1.

The encoding unit 150d assigns the code $\alpha 11\text{-}32$ to the front dither image data 11-32a and generates the outline information 11-32. For example, the encoding unit 150d selects a single code from among a plurality of unassigned codes $\alpha 11\text{-}n$ and assigns the selected code to the front dither image data 11-32a. The encoding unit 150d registers the information in which the front dither image data 11-32a and the code $\alpha 11\text{-}32$ are associated in the Zelkova tree information 140c. The encoding unit 150d sets the information on the outline shape of the object 11a included in the front dither image data 11-32a to the outline information 11-32.

The encoding unit 150d assigns the code $\beta 11\text{-}32$ to the rear dither image data 11-32b and, for example, the encoding unit 150d selects a single code from among a plurality of unassigned codes $\beta 11\text{-}n$ and assigns the selected code to the rear dither image data 11-32b. The encoding unit 150d registers the information in which the rear dither image data 11-32b is associated with the code $\beta 11\text{-}32$ in the Zelkova tree information 140c.

The encoding unit 150d sequentially stores the code $\alpha 11\text{-}32$ of the front dither image data 11-32a in the code area of the encoding file F1 in accordance with the encoded order. For example, because the block 11-32a is the ninth block to be encoded, the encoding unit 150d stores the block 11-32a in the code $\alpha 11\text{-}32$ in the code area for the ninth time in the process. Furthermore, the encoding unit 150d associates the order of the encoding, the code $\beta 11\text{-}32$ of the rear dither image data 11-32b, and the outline information and stores the associated information in the trailer portion.

The encoding unit 150d repeatedly performs the process described above on the other first type blocks.

An example of a process performed by the encoding unit 150d when the blocks targeted for encoding is the second type blocks will be described. The encoding unit 150d generates the dither image data based on the second type blocks. Here, a process in which the encoding unit 150d encodes the block 10-11 that becomes the second type block will be described.

The encoding unit 150d generates the dither image data 11-11 by performing dithering on the block 10-11 without processing anything. The encoding unit 150d assigns the code $\gamma 11\text{-}11$ to the dither image data 11-11. For example, the encoding unit 150d selects a single code from among the plurality of the unassigned codes $\gamma 11\text{-}n$ and assigns the selected code to the dither image data 11-11. The encoding unit 150d registers the information in which the dither image data 11-11 is associated with the code $\gamma 11\text{-}11$ in the Zelkova tree information 140c.

The process of encoding the other second type blocks is the same as the process of encoding the block 10-11 described above.

The encoding unit 150d encodes, in a manner described above, each of the blocks 10-11 to 10-45 in accordance with a predetermined order that has previously been defined and then sequentially stores the codes in the encoding file F1. For example, the encoding unit 150d encodes the blocks in accordance with the order of zigzag scan described in FIG. 2. Furthermore, the encoding unit 150d stores the Zelkova tree information 140c in the trailer portion included in the encoding file F1.

The output unit 150e is a processing unit that reads the encoding file F1 and that outputs the encoding file F1 to the extraction device 200.

Figure 7:
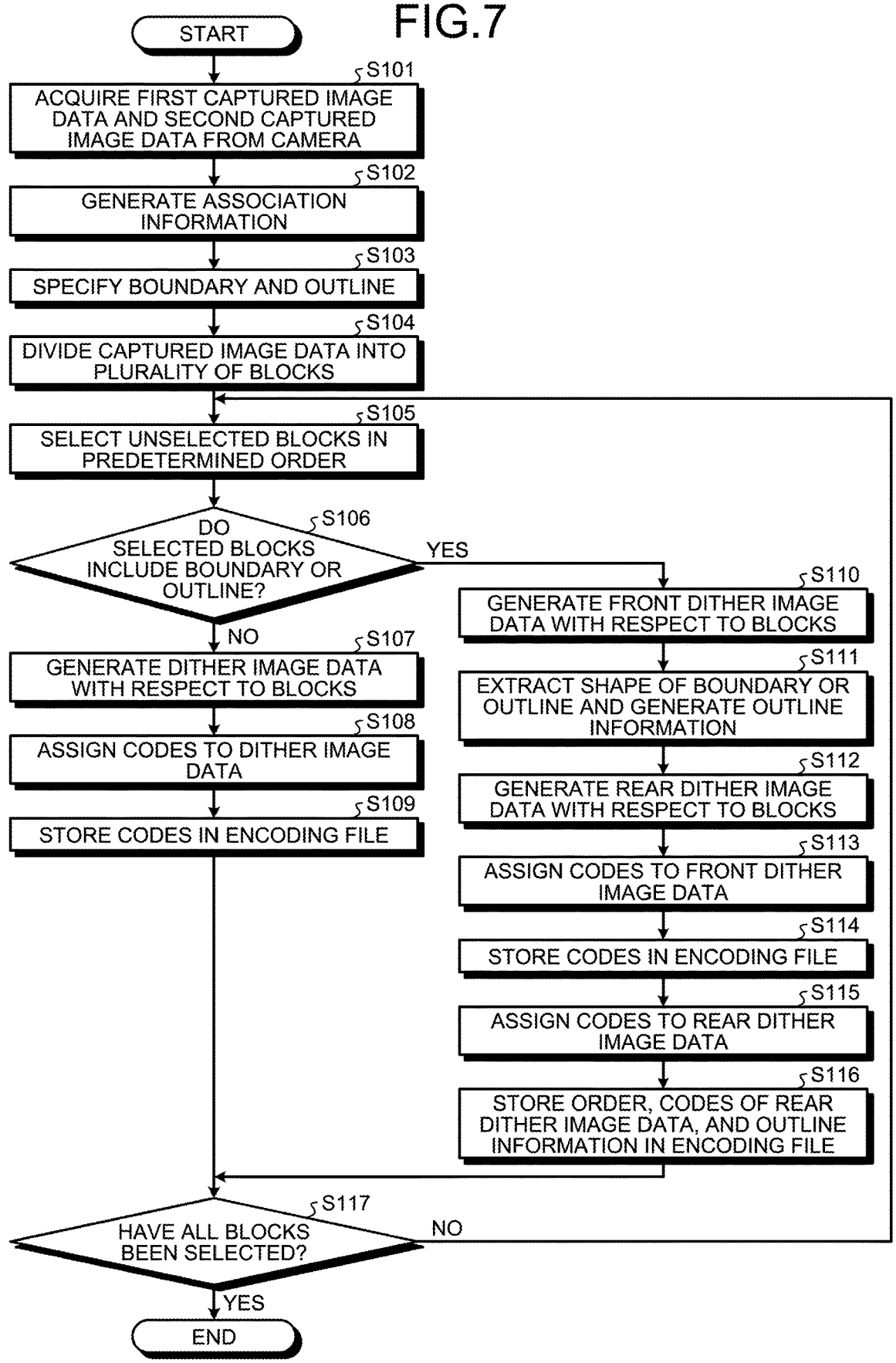
FIG. 7 is a flowchart illustrating the flow of a process performed by the storage control device according to the first embodiment.

In the following, an example of the flow of the process performed by the storage control device 100 according to the first embodiment will be described. FIG. 7 is a flowchart illustrating the flow of the process performed by the storage control device according to the first embodiment. As illustrated in FIG. 7, the acquiring unit 150a in the storage control device 100 acquires the first captured image data and the second captured image data from the camera 100a (Step S101).

The generating unit 150b in the storage control device 100 generates the association information 140b based on the principle of the stereo matching (Step S102). The specifying unit 150c in the storage control device 100 specifies the boundary and the outline based on the captured image data and the association information 140b (Step S103).

The encoding unit 150d in the storage control device 100 divides the captured image data into a plurality of blocks (Step S104). The encoding unit 150d sequentially selects unselected blocks in a predetermined order (Step S105).

If the selected blocks do not include the boundary or the outline (No at Step S106), the encoding unit 150d moves to Step S107. The encoding unit 150d generates dither image data with respect to the blocks (Step S107). The encoding unit 150d assigns a code to the dither image data (Step S108). The encoding unit 150d stores the code in the code area in the encoding file (Step S109) and moves to Step S117.

In contrast, if the selected blocks include the boundary and the outline (Yes at Step S106), the encoding unit 150d generates the front dither image data with respect to the blocks (Step S110). The encoding unit 150d extracts the shape of the boundary or the outline and generates the outline information (Step S111).

The encoding unit 150d generates the rear dither image data with respect to the blocks (Step S112). The encoding unit 150d assigns a code to the front dither image data (Step S113). The encoding unit 150d stores the code in the code area in the encoding file F1 (Step S114).

The encoding unit 150d assigns a code to the rear dither image data (Step S115). The encoding unit 150d stores the order, the code of the rear dither image data, and the outline information in the trailer portion in the encoding file (Step S116) and moves to Step S117.

If the encoding unit 150d has selected all of the blocks (Yes at Step S117), the encoding unit 150d ends the process. In contrast, if the encoding unit 150d has not selected all of the blocks (No at Step S117), the encoding unit 150d moves to Step S105.

Figure 8:
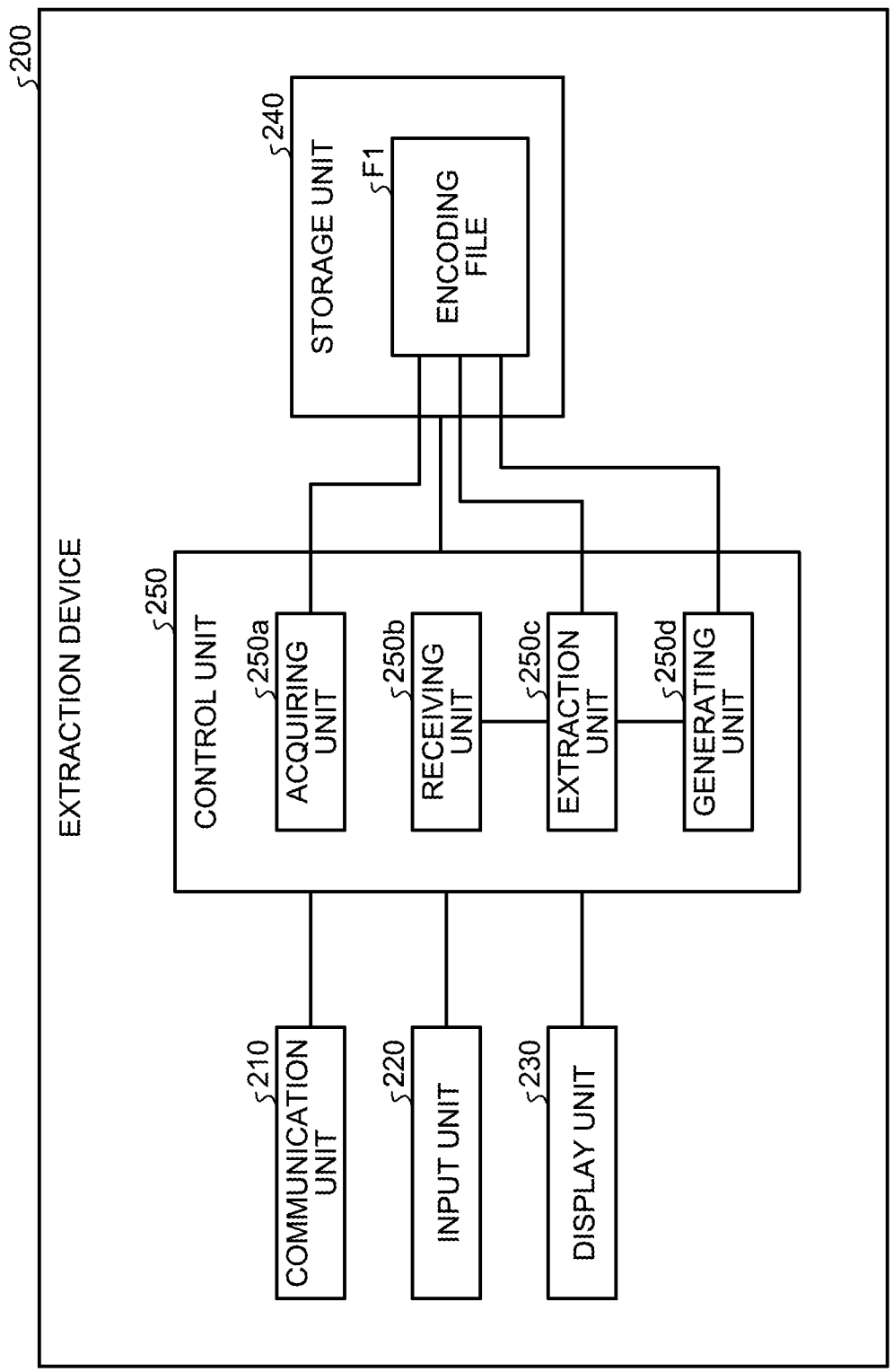
FIG. 8 is a diagram illustrating a configuration of the extraction device according to the first embodiment.

In the following, an example of a configuration of the extraction device 200 illustrated in FIG. 4 will be described. FIG. 8 is a diagram illustrating the configuration of the extraction device according to the first embodiment. As illustrated in FIG. 8, the extraction device 200 includes a communication unit 210, an input unit 220, a display unit 230, a storage unit 240, and a control unit 250.

The communication unit 210 is a processing unit that performs data communication with the storage control device 100. The communication unit 210 receives the encoding file F1 from the storage control device 100. For example, the communication unit 210 corresponds to the communication device. The control unit 250, which will be described later, sends and receives data to and from the storage control device 100 via the communication unit 210.

The input unit 220 is an input device that inputs various kinds of information to the extraction device 200. The input unit 220 corresponds to a keyboard, a mouse, a touch panel, or the like.

The display unit 230 is a display device that displays information output from the control unit 250. The display unit 230 corresponds to a liquid crystal display, a touch panel, or the like.

The storage unit 240 includes the encoding file F1. The storage unit 240 corresponds to a semiconductor memory device, such as a RAM, a ROM, and a flash memory, or a storage device, such as an HDD.

The encoding file F1 is data generated by the storage control device 100 and corresponds to the encoding file F1 illustrated in FIG. 1.

The control unit 250 includes an acquiring unit 250a, a receiving unit 250b, an extraction unit 250c, and a generating unit 250d. The control unit 250 can be implemented by a CPU, an MPU, or the like. Furthermore, the control unit 250 can also be implemented by hard-wired logic, such as an ASIC, and an FPGA.

The acquiring unit 250a is a processing unit that acquires the encoding file F1 from the storage control device 100. The acquiring unit 250a stores the acquired encoding file F1 in the storage unit 240.

The receiving unit 250b is a processing unit that receives an instruction to extract the outline of the object included in the captured image data. If the receiving unit 250b receives an instruction to extract the outline, the receiving unit 250b outputs a control signal to the extraction unit 250c.

The extraction unit 250c is a processing unit that extracts the outline of the object included in the captured image data if the extraction unit 250c receives the control signal from the receiving unit 250b. In the first embodiment, as an example, a process in which the extraction unit 250c extracts the outline of the object 11a based on the encoding file F1 will be described.

For example, the extraction unit 250c generates the extraction image data 20 and divides the extraction image data 20 into the plurality of the blocks 20-11 to 20-45. It is assumed that the number of the blocks 20-11 to 20-45 is the same as that of the blocks 10-11 to 10-45 in the captured image data 10 described in FIG. 1.

The extraction unit 250c sequentially scans the code area in the encoding file F1 and specifies the codes assigned to the front dither image data in the first type blocks. The extraction unit 250c specifies, from the blocks 20-11 to 20-45, the blocks that include the outline of the object 11a by using, as a key, the order in which the codes assigned to the front dither image data included in the first type blocks were stored.

For example, it is assumed that the order in which the codes assigned to the front dither image data included in the first type blocks were stored in the code area is the order of 2, 5, 6, 7, 9, 13, 16, 17, and 18 and it is assumed that each of the blocks is encoded in the order described in FIG. 2. In this case, the extraction unit 250c specifies the blocks that include the outline of the object 11a as the blocks 20-12, 20-13, 20-14, 20-22, 20-24, 20-32, 20-34, 20-43, and 20-44.

The extraction unit 250c acquires the outline information associated with the order of 2, 5, 6, 7, 9, 13, 16, 17, and 18 from the trailer portion in the encoding file F1 and sets the outline that is included in each of the blocks. For example, it is assumed that the pieces of the outline information associated with the order of 2, 5, 6, 7, 9, 13, 16, 17, and 18 are the outlines 30-12, 30-13, 30-14, 30-22, 30-24, 30-32, 30-34, 30-43, and 30-44, respectively, illustrated in FIG. 3.

The extraction unit 250c extracts, as the outline vector of the object 11a, the outline that is a combination of the set outlines 30-12, 30-13, 30-14, 30-22, 30-24, 30-32, 30-34, 30-43, and 30-44. The extraction unit 250c outputs the information on the extracted outline vector to the generating unit 250d.

Figures 9A, 9B:
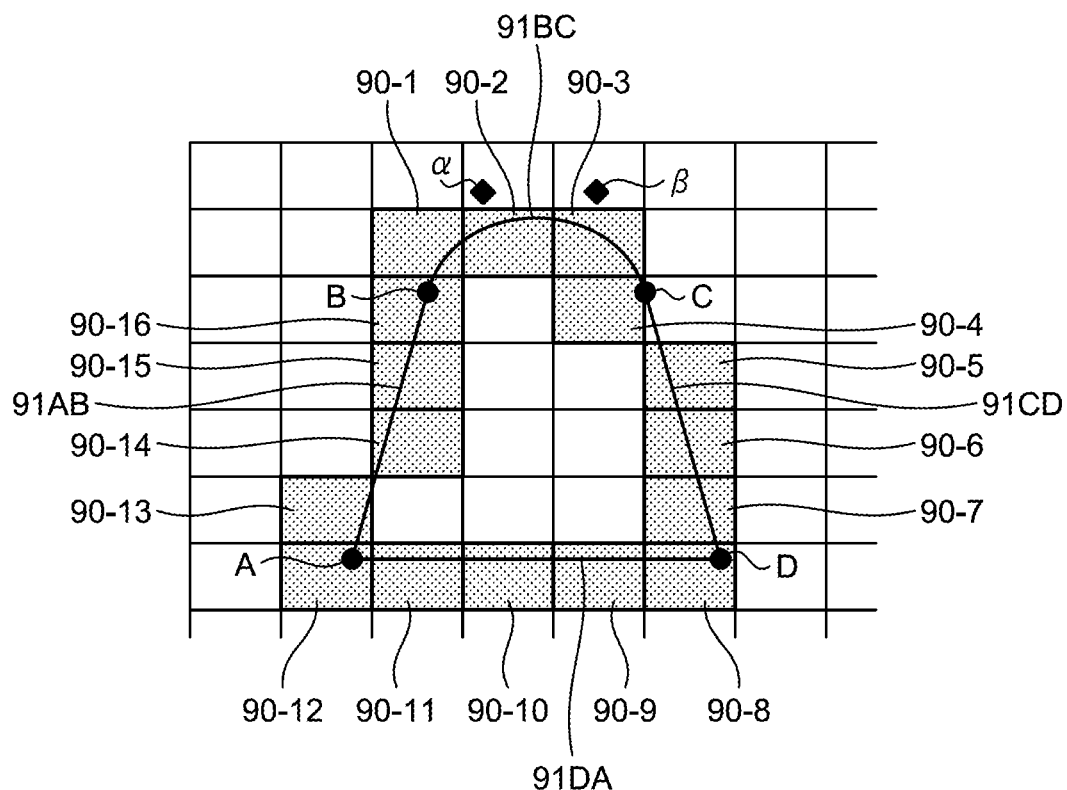
FIG. 9A is a diagram illustrating a process of generating PostScript data according to the first embodiment.
FIG. 9B is a diagram illustrating an example of PostScript data.

The generating unit 250d is a processing unit that generates PostScript data based on the information on the outline vector. FIG. 9A is a diagram illustrating a process of generating PostScript data according to the first embodiment. In a description below, for the purpose of convenience, it is assumed that the blocks that includes the outline are blocks 90-1 to 90-16 illustrated in FIG. 9A. The generating unit 250d sets the contour blocks based on the information on the outline vector acquired from the extraction unit 250c. For example, the generating unit 250d prepares a plurality of blocks, compares the plurality of blocks with the outline vector, and specifies the blocks 90-1 to 90-16 that includes the outline vector as the contour block.

The generating unit 250d generates a line segment 91 that passes through each of the external blocks 90-1 to 90-16 by combining straight lines and curved lines (Bezier curve). For example, the line segment 91 is formed of a straight line 91AB, a curved line 91BC, a straight line 91DC, and a straight line 91DA. The straight line 91AB is a straight line connecting a connecting point A and a connecting point B. A curved line 91BC is a curved line connecting the connecting point B and a connecting point C and the shape of the curved line is determined by control points α and β and control points (endpoint nodes) B and C. A straight line 91CD is a straight line connecting the connecting point C and a connecting point D. The straight line 91DA is a straight line connecting the connecting point D and the connecting point A.

The generating unit 250d generates the PostScript data of the outline based on the control points A, B, C, and D and the control points α and β. FIG. 9B is a diagram illustrating an example of the PostScript data. "Xa, Ya" included in PostScript data 95 illustrated in FIG. 9B indicates the coordinates of the connecting point A. "Xb, Yb" indicates the coordinates of the connecting point B. "Xc, Yc" indicates the coordinates of the connecting point C. "Xd, Yd" indicates the coordinates of the connecting point D. "Xα, Yβ" indicates the coordinates of the control point α. The generating unit 250d may also store the generated PostScript data 95 in the storage unit 140 or may also output the generated PostScript data 95 to an external device.

Furthermore, the generating unit 250d may also store the generated PostScript data of the outline in the trailer portion in the encoding file F1. FIG. 9C is a diagram illustrating an example in which the PostScript data is stored. As illustrated in FIG. 9C, the generating unit 250d stores the PostScript data 95 illustrated in FIG. 9B in the trailer portion in the encoding file F1. For example, by storing the PostScript data 95 in the trailer portion in the encoding file F1, it is possible to reuse the PostScript data 95. By reading and using the PostScript data 95, it is possible to specify the outline of the object 11a or the like without decoding the codes stored in the code area.

Figure 10:
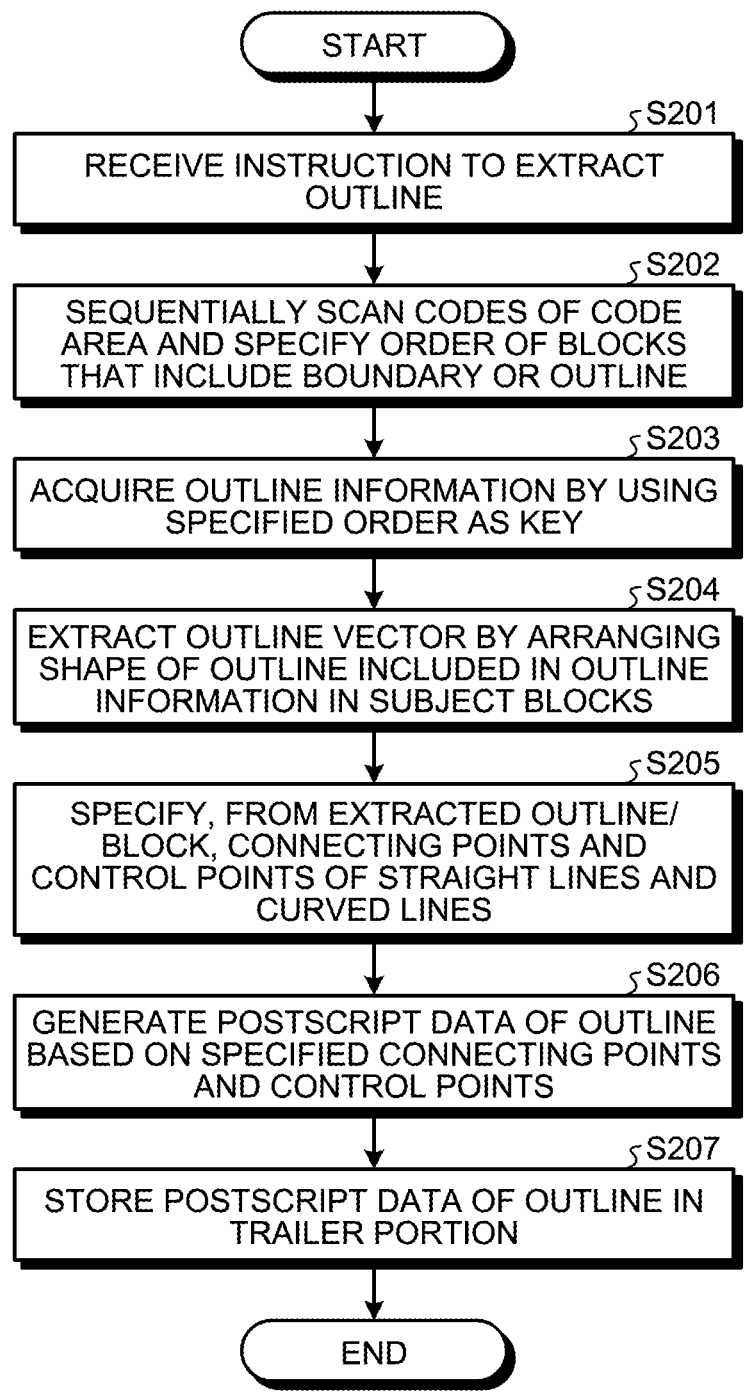
FIG. 10 is a flowchart illustrating the flow of a process performed by the extraction device according to the first embodiment.

In the following, an example of the flow of a process performed by the extraction device 200 according to the first embodiment will be described. FIG. 10 is a flowchart illustrating the flow of the process performed by the extraction device according to the first embodiment. As illustrated in FIG. 10, the receiving unit 250b in the extraction device 200 receives an instruction to extract the outline (Step S201).

The extraction unit 250c in the extraction device 200 sequentially scans the codes of the code area in the encoding file F1 and specifies the order of the codes of the blocks that include the boundary or the outline from among the plurality of blocks (Step S202).

The extraction unit 250c acquires the outline information from the trailer portion by using the specified order as a key (Step S203). The extraction unit 250c extracts the outline/block (outline vector) by arranging the shape of the outline included in the outline information in the subject blocks (Step S204).

The generating unit 250d specifies, from the extracted outline/block, the connecting points and the control points of the straight lines and the curved lines (Step S205). The generating unit 250d generates the PostScript data of the outline based on the specified connecting points and the control points (Step S206). The generating unit 250d stores the PostScript data of the outline in the trailer portion (Step S207).

Subsequently, the effect of the storage control device 100 according to the first embodiment will be described. The storage control device 100 divides the captured image data 10 into a plurality of blocks, scans the blocks in a predetermined order, encodes each of the blocks, and sequentially stores the codes in the code area in the encoding file F1 in the order of the codes they are encoded. At this time, if the blocks targeted for encoding are the first type blocks, the storage control device 100 performs a process of assigning the codes that can be distinguished from the codes of the second type blocks, associating the outline information on the object included in the first type blocks with the order in which the blocks were encoded, and storing the associated information in the trailer portion. Consequently, it is possible to specify the blocks that include the outline of the object by scanning the code area without decoding the codes stored in the code area and without generating the captured image data 10 and it is thus possible to easily recycle the outline (outline vector) of the object by acquiring the outline information associated with the specified blocks from the trailer portion.

Furthermore, when the storage control device 100 assigns a code to each of the pieces of dither image data, the storage control device 100 uses a Zelkova tree (neural tree) instead of a conventionally used Huffman tree. Consequently, this makes it possible to cope with an increase in the number of distinguishable codes and prevent degradation of the image quality. Furthermore, because a Zelkova tree does not have node points and codes and leaves (dither image data) are directly associated, it is possible to acquire the leaves (dither image data) associated with the codes at high speed.

The effects of the extraction device 200 according to the first embodiment will be described. The extraction device 200 extracts the outline (outline vector) of the object by scanning a code area, specifying blocks that include the outline of the object, and acquiring the outline information associated with the specified blocks from the trailer portion. In this process, it is possible to extract the outline of the object 11a without decoding the encoded information or performing edge detection by using the EM algorithm. Thus, with the extraction device 200, it is possible to easily specify the outline of the object included in the captured image.

[b] Second Embodiment

Figure 11:
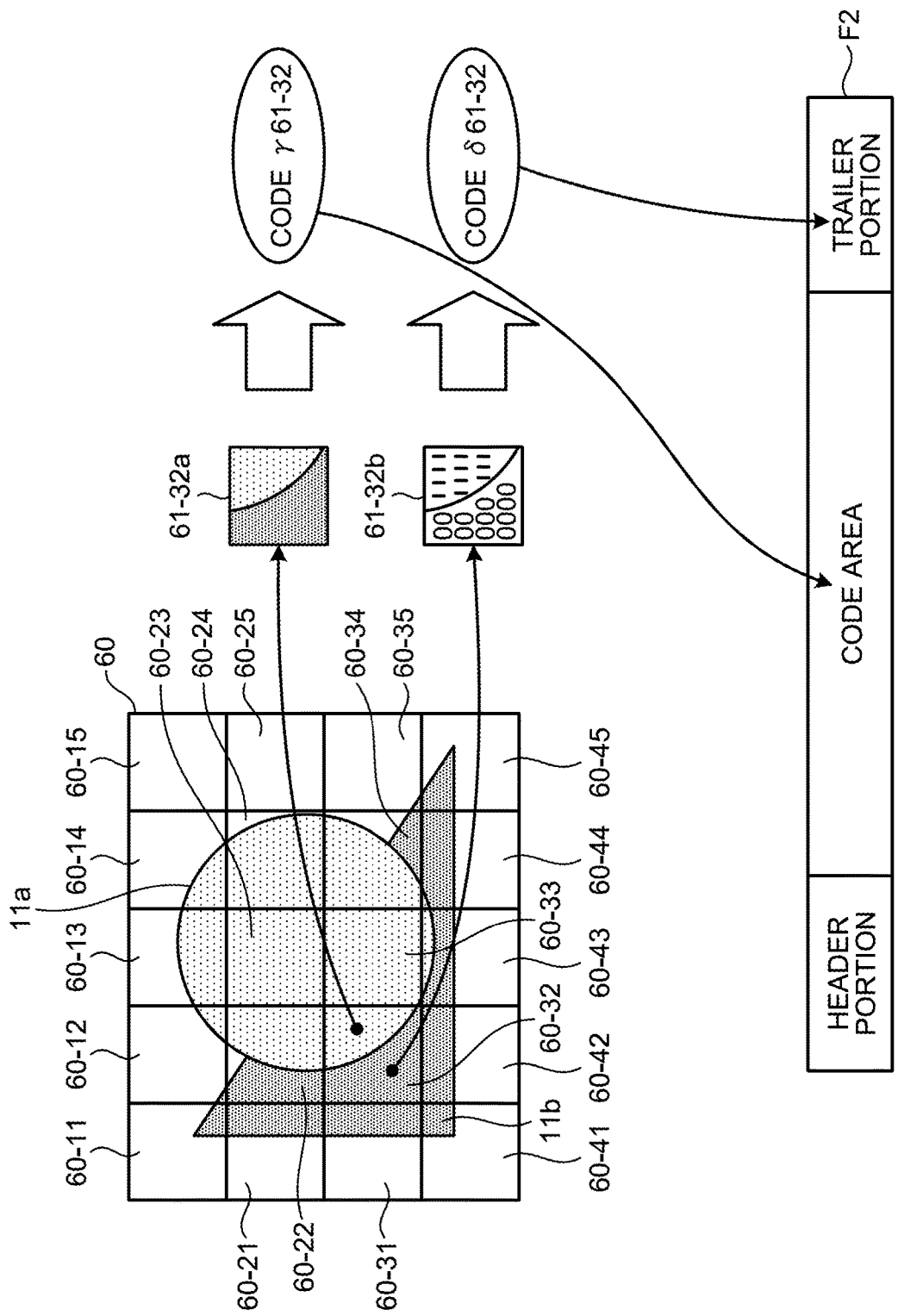
FIG. 11 is a diagram (1) illustrating an example of a process performed by a storage control device according to a second embodiment.
Figure 12:
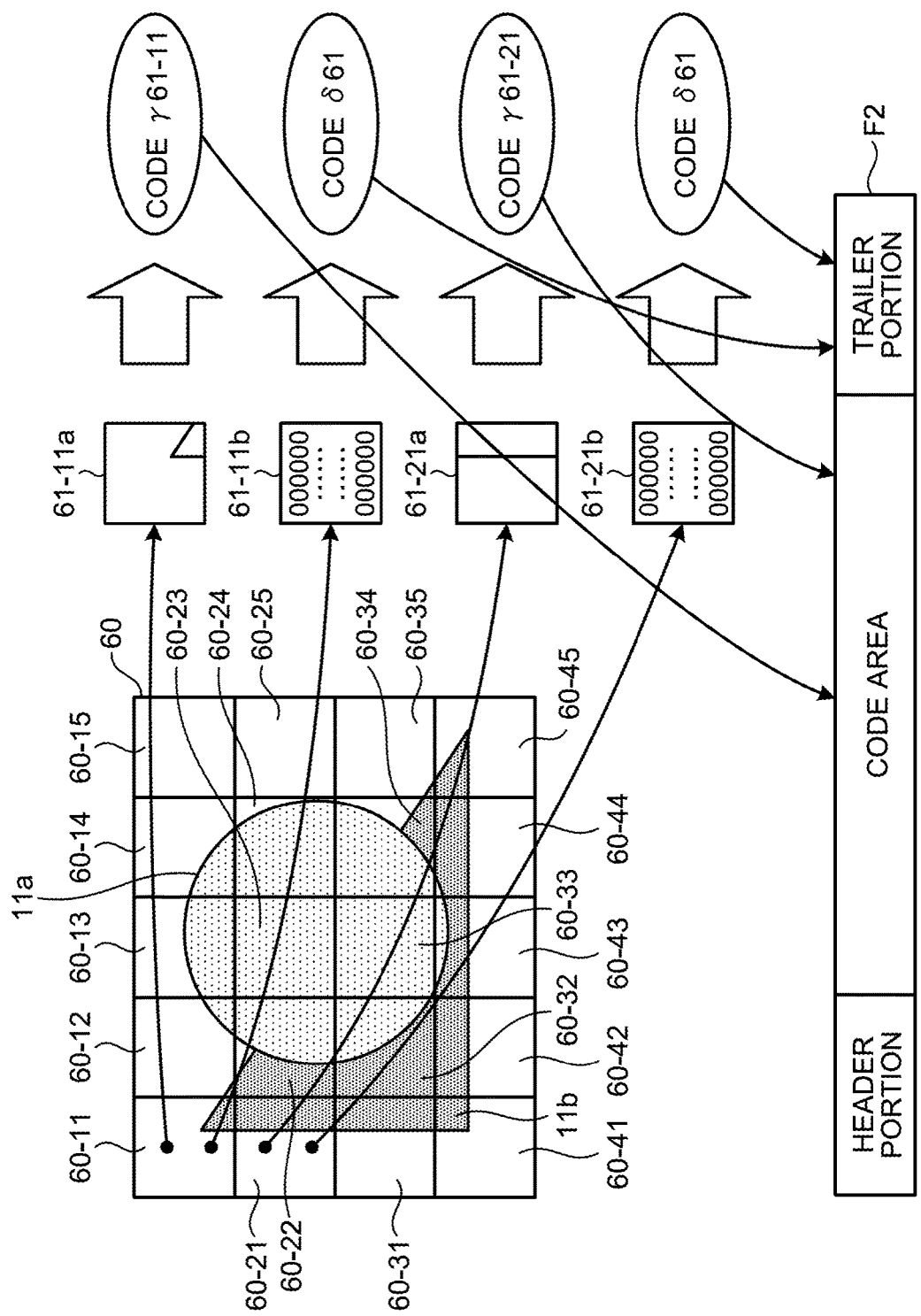
FIG. 12 is a diagram (2) illustrating an example of a process performed by the storage control device according to the second embodiment.

FIGS. 11 and 12 are diagrams each illustrating an example of a process performed by a storage control device according to a second embodiment. As illustrated in FIG. 11 (FIG. 12), the storage control device acquires a captured image data 60 targeted for compression. For example, the captured image data 60 is image data obtained by capturing the object 11a and the object 11b. In the example illustrated in FIG. 11, the object 11a is located anterior to the object 11b.

The storage control device divides the captured image data 60 into a plurality of blocks 60-11 to 60-45. The storage control device specifies, based on the association information, the blocks that include the boundary of each of the objects or that include the outline of the target object from among the plurality of the blocks 60-11 to 60-45.

The association information is information indicating the blocks that include the boundary of each of the objects or the outline of the target object. Furthermore, the association information includes, from among the areas of the blocks, information on the area of the target object and information on the other areas. In the second embodiment, as an example, a description will be given with the assumption that the target object is the object 11a.

In a description below, when particularly distinguishing the blocks, the blocks that include the boundary of each of the objects or the outline of the target object is referred to as "first type blocks". The blocks that do not include the boundary of each of the objects and that do not include the outline of the target object is referred to as "second type blocks".

In the example illustrated in FIG. 11, the first type blocks correspond to the blocks 60-12, 60-13, 60-14, 60-22, 60-24, 60-32, 60-34, 60-43, and 60-44. The other blocks that do not correspond to the first type blocks correspond to the second type blocks.

An example of a process in which the storage control device encodes (compresses) the first type blocks will be described. Here, a process in which the storage control device encodes the block 60-32 will be described.

The storage control device generates dither image data 61-32a by performing dithering on the block 60-32. The storage control device assigns a code γ61-32 to the dither image data 61-32a.

Furthermore, the storage control device specifies, based on the association information, in the area of the block 60-32, the area of the object 11a and the area of the object 11a. The storage control device generates superimposition information 61-32b by setting, in the area of the block 60-32, the pixel value of the area of the object 11a to "1" and the pixel value of the area other than the object 11a to "0". In the superimposition information 61-32b, the boundary between 0 and 1 indicates the shape of the boundary between the object 11a and the object 11b (the outline of the object 11a). Furthermore, by assigning a plurality of bits to a single pixel, it is possible to represents the superimposition and its order in a case where a plurality of objects is present in a block.

The storage control device assigns a code δ61-32 to the superimposition information 61-32b.

A process of encoding the other first type blocks is the same as the process of encoding the block 60-32 described above. Namely, the storage control device generates dither image data and superimposition information on each of the first type blocks and assigns a code.

An example of a process in which the storage control device encodes (compresses) the second type blocks will be described with reference to FIG. 12. Here, a process in which the storage control device encodes the blocks 60-11 and 60-21 will be described.

As illustrated in FIG. 12, the storage control device generates dither image data 61-11a by performing dithering on the block 60-11 without processing anything. The storage control device assigns a code γ61-11 to the dither image data 61-11a.

Furthermore, the storage control device generates superimposition information 61-11b by setting all of the pixel values in the area of the block 60-11 to "0". The storage control device assigns the code δ61 to the superimposition information 61-11b.

The storage control device generates dither image data 61-21a by performing dithering on the block 60-21 without processing anything. The storage control device assigns a code γ61-21 to the dither image data 61-21a.

Furthermore, the storage control device generates superimposition information 61-21b by setting all of the pixel values in the area of the block 60-21 to "0". The storage control device assigns the code δ61 to the superimposition information 61-21b.

The process of encoding the other second type blocks is the same as the process of encoding the blocks 60-11 and 60-21 described above. Furthermore, "0" is set to all pieces of the superimposition information generated based on the second type blocks and the code (code δ61) to be assigned is used in common. Consequently, from among the codes assigned to the superimposition information on each of the blocks 60-11 to 60-45, the codes other than the "code δ61" become the codes associated with the first type blocks (superimposition information on the first type blocks).

The storage control device encodes each of the blocks 60-11 to 60-45 in accordance with a predetermined order that has previously been defined and then sequentially stores the codes on the dither image data and the codes on the superimposition information in the encoding file F2. For example, the encoding file F2 includes a header portion, a code area, and a trailer portion.

The header portion is an area that stores therein various kinds of control information. The code area is an area that stores therein codes of dither image data. The trailer portion is an area that stores therein codes of superimposition information.

The order of encoding performed by the storage control device is the same as the order of zigzag scan described in the first embodiment with reference to FIG. 2. For example, the order of encoding is the order of the blocks 60-11, 60-12, 60-21, 60-31, 60-22, 60-13, 60-14, 60-23, 60-32, 60-41, 60-42, 60-33, 60-24, 60-15, 60-25, 60-34, 60-43, 60-44, 60-35, and 60-45.

The storage control device stores, in the order of encoding, the code assigned to dither image data of each of the blocks in the code area in the encoding file F2. Furthermore, the storage control device stores, in the order of encoding, the code assigned to the superimposition information on each of the blocks in the area dedicated to the superimposition information in the trailer portion in the encoding file F2.

For example, the storage control device encodes the block 60-32 for the ninth time. Thus, the storage control device stores the code γ61-32 assigned to the dither image data associated with the block 60-32 in the ninth area in the code area. Furthermore, the storage control device stores the code δ61-32 assigned to the superimposition information associated with the block 60-32 in the ninth area in the trailer portion (the area dedicated to the superimposition information provided in the trailer portion).

Furthermore, the storage control device stores, in the trailer portion, the information in which the superimposition information is associated with the codes.

As described above, the storage control device divides the captured image data 60 into a plurality of blocks; scans the blocks in a predetermined order; encodes each of the blocks; and sequentially stores, in the order of encoding, the codes in the code area and the trailer portion included in the encoding file F1. Here, the storage control device performs a process of generating superimposition information in which the areas of the object 11a included in the blocks are set to "1" and the other areas are set to "0", assigning codes to the superimposition information, and storing the codes in the trailer portion. Thus, it is possible to specify the blocks each of which includes the outline of the object by scanning the codes of the superimposition information stored in the trailer portion and it is possible to easily recycle the outline (outline vector) of the object by specifying the boundary between the superimposition information indicated by "1" and "0" associated with the codes.

Figure 13:
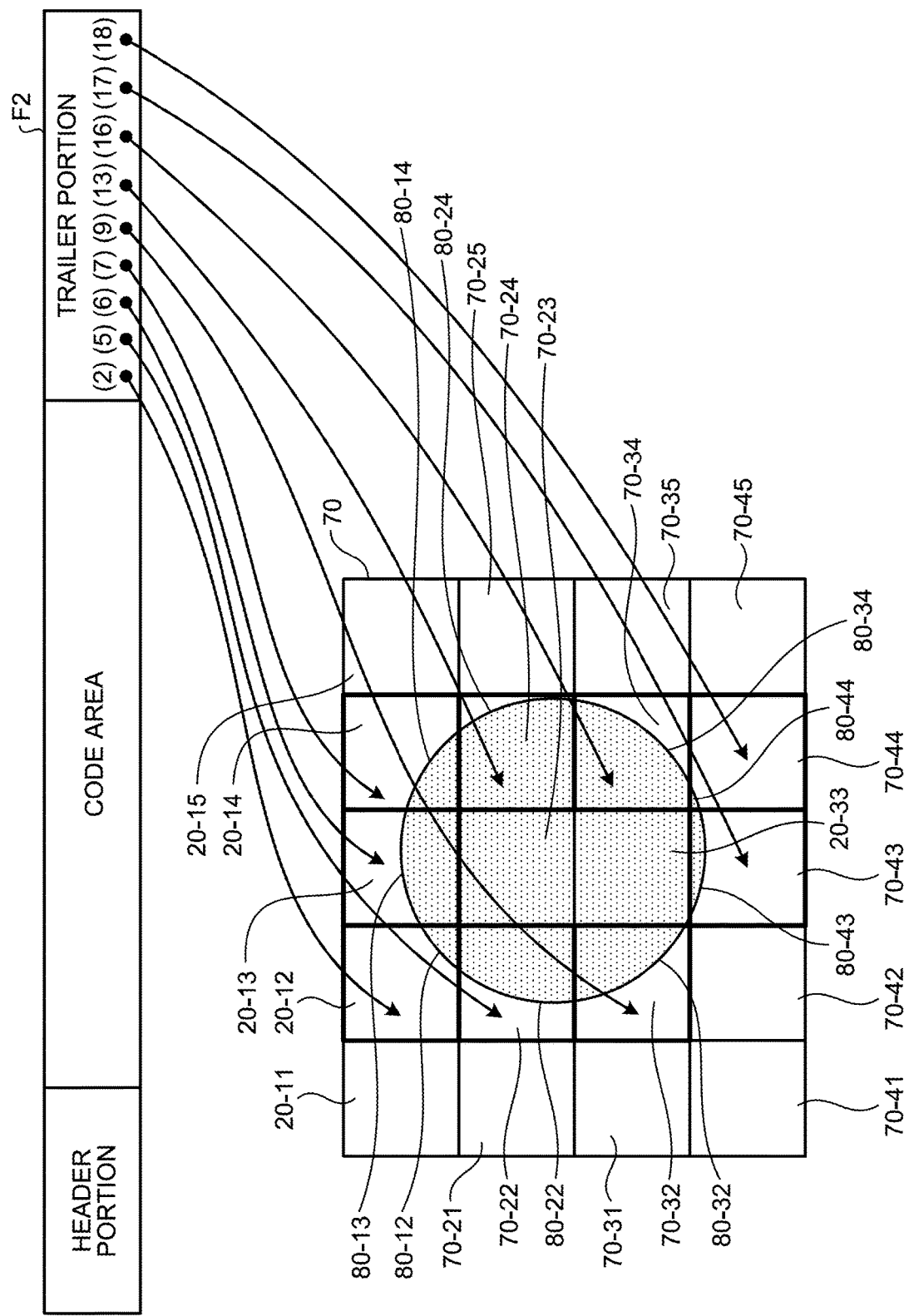
FIG. 13 is a diagram illustrating an example of a process performed by an extraction device according to the second embodiment.

In the following, a description will be given of an example of a process of extracting, performed by the extraction device the outline vectors of the object based on the encoding file F2 generated by the storage control device described with reference to FIG. 11 and FIG. 12. FIG. 13 is a diagram illustrating an example of the process performed by an extraction device according to the second embodiment. For example, the extraction device generates extraction image data 70 and divides the extraction image data 70 into a plurality of blocks 70-11 to 70-45. It is assumed that the number of the blocks 70-11 to 70-45 is the same as that of the blocks 60-11 to 60-45 in the captured image data 60 described in FIG. 11.

The extraction device sequentially scans the areas in each of which the superimposition information in the trailer portion in the encoding file F2 has been assigned and specifies the codes other than the code "δ61" that is associated with the superimposition information in which "0" is set to all of the areas. The extraction device specifies, by using the order in which the specified codes were stored as a key, the blocks that include the outline of the object 11a from among the blocks 70-11 to 70-45. For example, if it is assumed that the order in which the pieces of superimposition information were stored in the areas is the order of 2, 5, 6, 7, 9, 13, 16, 17, and 18 and if it is assumed that each of the blocks is encoded in the order described in FIG. 2, the blocks that include the outline of the object 11a are blocks 70-12, 70-13, 70-14, 70-22, 70-24, 70-32, 70-34, 70-43, and 70-44.

Furthermore, based on the boundary portion between "0" and "1" indicated by the superimposition information associated with the specified code, the extraction device sets the outline included in each of the blocks. For example, the extraction device sets the outline (boundary) associated with the order of 2, 5, 6, 7, 9, 13, 16, 17, and 18 to the outlines 80-12, 80-22, 80-12, 80-14, 80-32, 80-24, 80-34, 80-43, and 80-44, respectively.

The extraction device extracts the outline that is a combination of the set outlines 80-12, 80-13, 80-14, 80-22, 80-24, 80-32, 80-34, 80-43, and 80-44 as the outline vectors of the object 11a.

In this way, the extraction device extracts the outline (outline vector) of the object by scanning the trailer portion, specifying the blocks that include the outline of the object, and acquiring the information on the boundary that is indicated by 0 and 1 and that is related to the superimposition information of the code associate with the specified blocks. In this process, it is possible to extract the outline of the object 11a without decoding the encoded information and performing edge detection by using the EM algorithm. Consequently, with the extraction device, it is possible to easily specify the outline of the object included in the captured image.

Figure 14:
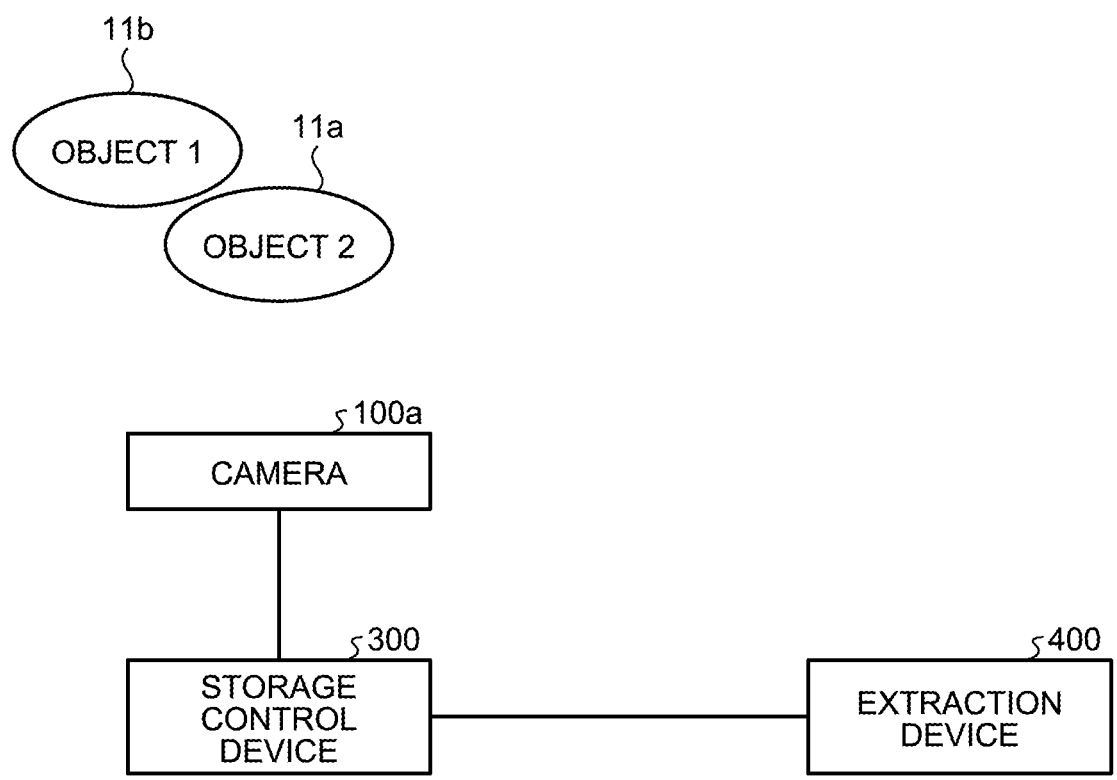
FIG. 14 is a diagram illustrating an example of a system according to the second embodiment.

In the following, an example of a system according to the second embodiment will be described. FIG. 14 is a diagram illustrating an example of the system according to the second embodiment. As illustrated in FIG. 14, this system includes the camera 100a, a storage control device 300, and an extraction device 400. The storage control device 300 is connected to the camera 100a and the extraction device 400. In the second embodiment, as an example, it is assumed that the object 11a and the object 11b are arranged in the capturing range of the camera 100a.

A description of the camera 100a is the same as the description of the camera 100a described in FIG. 4.

The storage control device 300 is a device, as described in FIG. 11 and FIG. 12, that divides the captured image data 60 into a plurality of blocks and that generates the encoding file F2 by encoding each of the blocks. The storage control device 300 sends the encoding file F2 to the extraction device 400.

The extraction device 400 is a device, as described in FIG. 13, that scans the encoding file F2 and that extracts the outline vectors. The extraction device 400 may also the information on the extracted outline vector to a display device or another device (not illustrated).

In FIG. 14, as an example, a description has been given of a case in which the storage control device 300 and the extraction device 400 are separate devices; however, the example is not limited to this. For example, the functions of the storage control device 300 and the extraction device 400 may also be held by a single server or the functions of the storage control device 300 and the extraction device 400 may also be implemented by a plurality of servers in cloud environments in cooperation with each other.

In the following, an example of the configuration of the storage control device 300 illustrated in FIG. 14 will be described. FIG. 15 is a diagram illustrating the configuration of the storage control device according to the second embodiment. As illustrated in FIG. 15, this storage control device includes a communication unit 310, a storage unit 340, and a control unit 350. Although not illustrated, the storage control device 300 may also include an input device that inputs various kinds or information, a display device that displays information generated by the storage control device 300, and the like.

The communication unit 310 is a processing unit that performs data communication between the camera 100a and the extraction device 400. The communication unit 310 acquires the first captured image data and the second captured image data from the camera 100a. Furthermore, the communication unit 310 sends the information in the encoding file F2 generated by the storage control device 300 to the extraction device 400. For example, the communication unit 310 corresponds to the communication device. The control unit 350, which will be described later, sends and receives data to and from the camera 100a and the extraction device 400 via the communication unit 310.

The storage unit 340 includes a buffer 340a, association information 340b, Zelkova tree information 340c, superimposition management information 340d, and an encoding file F2. The storage unit 340 corresponds to a semiconductor memory device, such as a RAM, a ROM, and a flash memory, or a storage device, such as an HDD.

The buffer 340a is a buffer that stores therein the first captured image data and the second captured image data of images captured by the camera 100a.

The association information 340b includes information on the boundary between different objects included in the first captured image data or information on the outline of the object included in the first captured image data. For example, the information on the boundary and the outline corresponds to the location information on the boundary and the outline on the first captured image data.

The Zelkova tree information 340c is dictionary information in which codes assigned to the dither image data are defined. FIG. 16 is a diagram illustrating a data structure of the Zelkova tree information according the second embodiment. As illustrated in FIG. 16, the Zelkova tree information 340c associates leaves (dither image data) with codes. The dither image data is dither image data generated from the first type blocks or the second type blocks. The code indicates the code to be assigned to the associated dither image data. Here, descriptions related to the Zelkova tree and the Huffman tree correspond to the descriptions performed in FIG. 6B. The Zelkova tree is obtained by improving the Huffman tree so as not to have node points and is generated by aiming to increase the number of assigned codes and to speed up the process of specifying a leaf.

The superimposition management information 340d is dictionary information in which codes to be assigned to the superimposition information are defined. FIG. 17 is a diagram illustrating a data structure of the superimposition management information according to the second embodiment. As illustrated in FIG. 17, the superimposition management information 340d associates the superimposition information with the codes. The superimposition information is information in which the pixel values of the area of the object 11a are set to "1" and the pixel values of the areas other than the object 11a are set to "0" from among the block areas. Furthermore, if the object 11a is not present in a block, all of the pixel values of the superimposition information become "0".

The code indicates a code to be assigned to the associated superimposition information. Furthermore, the same code is assigned to the superimposition information in which all of the pixel values become "0". As described in FIG. 12, because all of the pixel values of the superimposition information on the second type blocks become "0", the same code is assigned to the superimposition information on each of the second type blocks. Furthermore, a unique code is assigned to the superimposition information on each of the first type blocks.

The encoding file F2 corresponds to the encoding file F1 illustrated in FIG. 11, FIG. 12, and the like.

The control unit 350 includes an acquiring unit 350a, a generating unit 350b, a specifying unit 350c, an encoding unit 350d, and an output unit 350e. The control unit 350 can be implemented by a CPU, an MPU, or the like. Furthermore, the control unit 350 can also be implemented by hare-wired logic, such as an ASIC or an FPGA.

The acquiring unit 350a is a processing unit that acquires the first captured image data and the second captured image data from the camera 100a. The acquiring unit 350a stores the acquired first captured image data and the second captured image data in the buffer 340a.

The generating unit 350b is a processing unit that generates the association information 340b based on the first captured image data and the second captured image data stored in the buffer 340a. The process of generating the association information 340b performed by the generating unit 350b is the same as the process of generating the association information 140b performed by the generating unit 150b described in the first embodiment.

The specifying unit 350c is a processing unit that divides the first captured image data into a plurality of blocks, compares the plurality of divided blocks with the association information, and specifying the first type blocks that include the boundary or the outline and the second type blocks that do not includes the boundary and the outline. The specifying unit 350c outputs, to the encoding unit 350d, the specified result and the information on the first captured image data that is divided into blocks.

For example, regarding each of the blocks, the specifying unit 350c compares the region of the block area with the location information on the boundary or the outline in the association information 340b. If the boundary or the outline is included in the region of the block area that is the comparison target, the specifying unit 350c sets the comparison target blocks to the first type blocks. In contrast, if the boundary and the outline are not included in the region of the block area that is the comparison target, the specifying unit 350c sets the comparison target blocks to the second type blocks.

The encoding unit 350d is a processing unit that encodes the first captured image data. Hereinafter, the first captured image data encoded by the encoding unit 350d is simply referred to as captured image data. Furthermore, the captured image data is captured image data that is divided into a plurality of blocks by the specifying unit 350c.

The encoding unit 350d encodes each of the blocks in a predetermined order. For example, the encoding unit 350d encodes each of the blocks in the order of zigzag scan in a similar way as each of the blocks of the captured image data 20 (60) described in FIG. 2. The encoding unit 350d assigns codes to the blocks targeted for encoding and sequentially stores the assigned codes in the code area in the encoding file F1. Furthermore, the encoding unit 350d generates superimposition information on the blocks, allocates codes to the generated superimposition information, and stores the allocated codes in the trailer portion in the encoding file F2.

An example of a process of encoding the first type blocks performed by the encoding unit 350d will be described. The encoding unit 350d generates the dither image data by performing dithering on the first type blocks without processing anything. Furthermore, the encoding unit 350d generates the superimposition information by setting, from among the areas in the first type blocks, the pixel values of the area of the object 11a to "1" and the pixel values of the other areas to "0".

The encoding unit 350d selects a single code from among a plurality of unassigned codes γ61-n and assigns the selected code to the dither image data of the first type block. The encoding unit 350d registers the information in which the dither image data is associated with the selected code in the Zelkova tree information 340c.

The encoding unit 350d selects a single code from among a plurality of unassigned codes δ61-n and assigns the selected code to the superimposition information on the first type block. The encoding unit 350d registers the information in which the superimposition information is associated with the selected code in the superimposition management information 340d.

An example of a process of encoding the second type blocks performed by the encoding unit 350d will be described. The encoding unit 350d generates the dither image data by performing dithering on the second type blocks without processing anything. Furthermore, the encoding unit 350d generates the superimposition information by setting the pixel values of all of the areas in the second type blocks to "0".

The encoding unit 350d selects a single code from among the plurality of unassigned codes γ61-n and assigns the selected code to the dither image data of the second type block. The encoding unit 350d registers the information in which the dither image data is associated with the selected code in the Zelkova tree information 340c.

The encoding unit 350d assigns a predetermined code (for example, δ61), which is previously defined, to the superimposition information on the second type block. The encoding unit 350d registers the information in which the superimposition information on the second type block is associated with the predetermined code in the superimposition management information 340d. Furthermore, if the superimposition information on the second type block has already been registered in the superimposition management information 340d, the related process will be skipped.

The encoding unit 350d performs encoding in the order of the encoding and sequentially stores the codes of the first type block or the second type block in the code area in the encoding file F2 in the order in which the blocks were coded. Furthermore, the encoding unit 350d stores the encoding of the superimposition information on the first type block or the second type block in the trailer portion in the encoding file F2 in which the blocks were coded. Furthermore, after the encoding has been ended, the encoding unit 350d stores the Zelkova tree information 340c and the superimposition management information 340d in the trailer portion in the encoding file F2.

The output unit 350e is a processing unit that reads the encoding file F2 and that outputs the read encoding file F2 to the extraction device 400.

Figure 18:
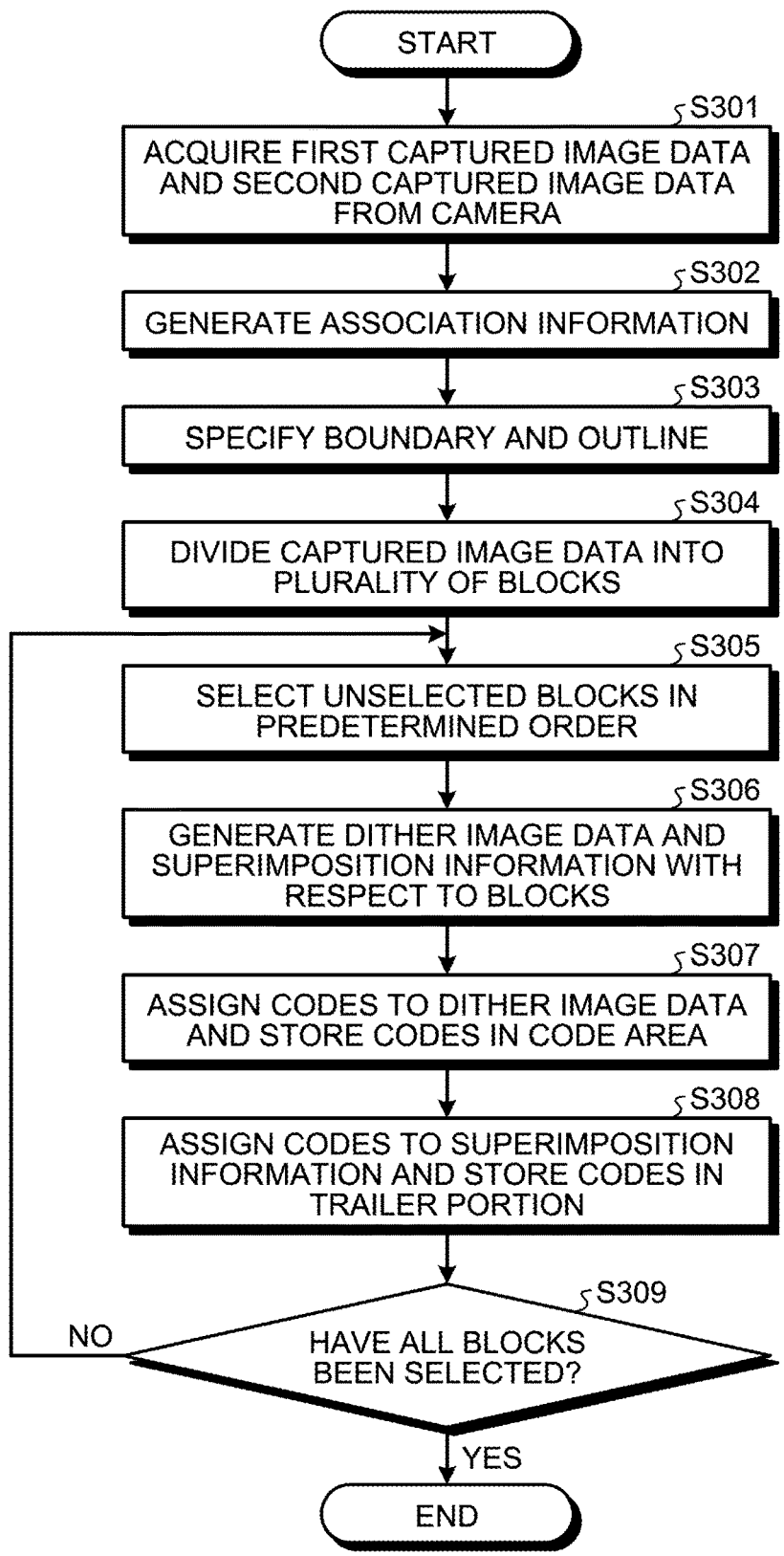
FIG. 18 is a flowchart illustrating the flow of a process performed by the storage control device according to the second embodiment.

In the following, an example of the flow of a process performed by the storage control device 300 according to the second embodiment will be described. FIG. 18 is a flowchart illustrating the flow of the process performed by the storage control device according to the second embodiment. As illustrated in FIG. 18, the acquiring unit 350a in the storage control device 300 acquires the first captured image data and the second captured image data from the camera 100a (Step S301).

The generating unit 350b in the storage control device 300 generates the association information 340b based on the principle of stereo matching (Step S302). The specifying unit 350c in the storage control device 300 specifies the boundary and the outline based on the captured image data and the association information 340b (Step S303).

The encoding unit 350d in the storage control device 300 divides the captured image data into a plurality of blocks (Step S304). The encoding unit 350d selects, in a predetermined order, unselected blocks (Step S305).

The encoding unit 350d generates the dither image data and the superimposition information with respect to the selected blocks (Step S306). The encoding unit 350d assigns codes to the dither image data and stores the codes in the code area (Step S307). The encoding unit 350d assigns codes to the superimposition information and stores the codes in the trailer portion (Step S308).

If the encoding unit 350d has not selected all of the blocks (No at Step S309), the encoding unit 350d moves to Step S305. In contrast, if the encoding unit 350d has selected all of the blocks (Yes at Step S309), the encoding unit 350d ends the process.

Figure 19:
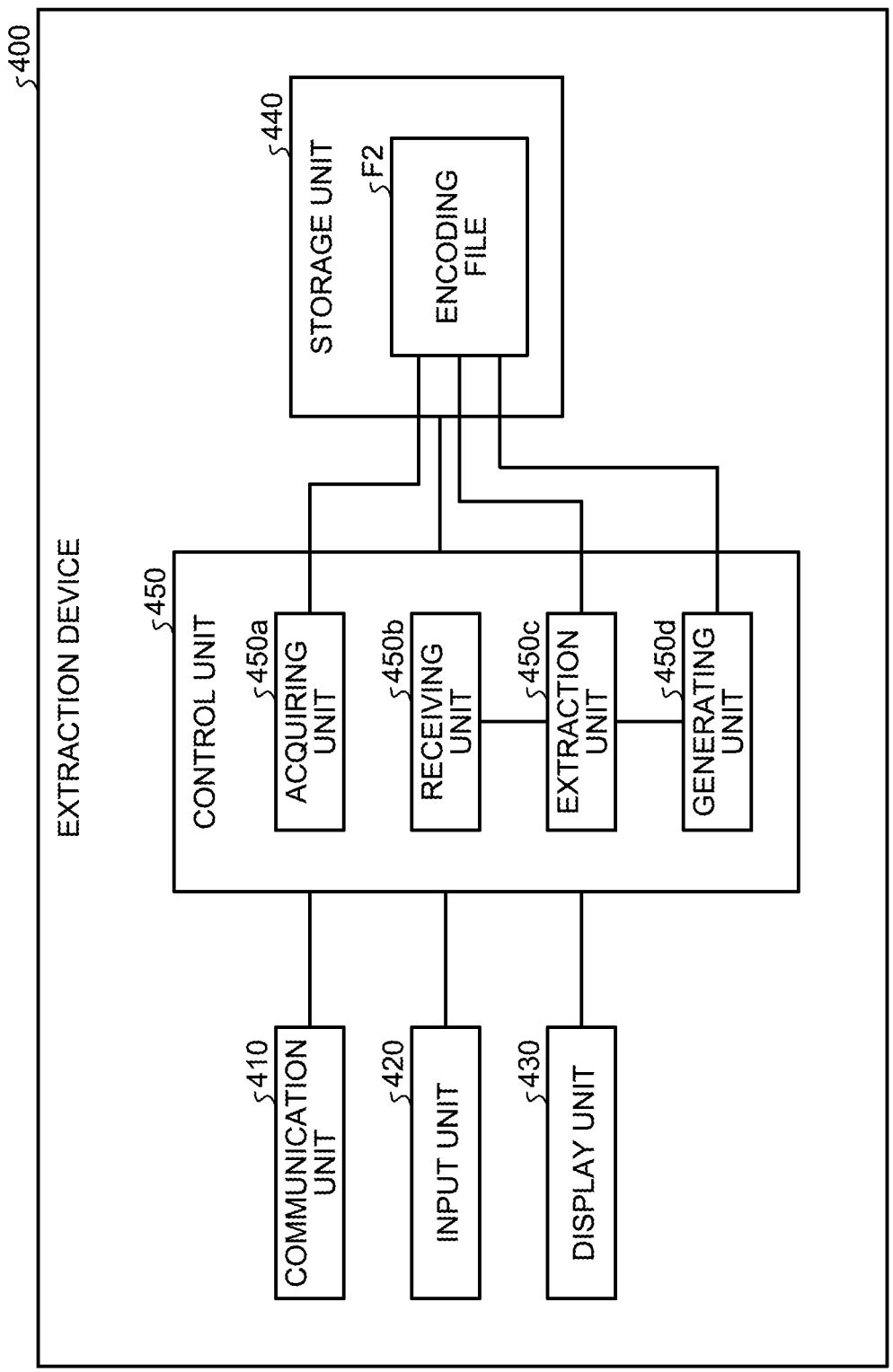
FIG. 19 is a diagram illustrating a configuration of the extraction device according to the second embodiment.

In the following, an example of a configuration of the extraction device 400 illustrated in FIG. 14 will be described. FIG. 19 is a diagram illustrating the configuration of the extraction device according to the second embodiment. As illustrated in FIG. 19, the extraction device 400 includes a communication unit 410, an input unit 420, a display unit 430, a storage unit 440, and a control unit 450.

The communication unit 410 is a processing unit that performs data communication with the storage control device 300. The communication unit 410 receives the encoding file F2 from the storage control device 300. For example, the communication unit 410 corresponds to a communication device. The control unit 450, which will be described later, sends and receives data to and from the storage control device 300 via the communication unit 410.

The input unit 420 is an input device that inputs various kinds of information to the extraction device 400. The input unit 420 corresponds to a keyboard, a mouse, a touch panel, or the like.

The display unit 430 is a display device that displays information output from the control unit 450. The display unit 430 corresponds to a liquid crystal display, a touch panel, or the like.

The storage unit 440 includes the encoding file F2. The storage unit 440 corresponds to a semiconductor memory device, such as a RAM, a ROM, and a flash memory, or a storage device, such as an HDD.

The encoding file F2 is data generated by the storage control device 300 and corresponds to the encoding file F2 illustrated in FIG. 11.

The control unit 450 includes an acquiring unit 450a, a receiving unit 450b, an extraction unit 450c, and a generating unit 450d. The control unit 450 can be implemented by a CPU, an MPU, or the like. Furthermore, the control unit 450 may also be implemented by hard-wired logic, such as an ASIC or an FPGA.

The acquiring unit 450a is a processing unit that acquires the encoding file F2 from the storage control device 300. The acquiring unit 450a stores the acquired encoding file F2 in the storage unit 440.

The receiving unit 450b is a processing unit that receives an instruction to extract the outline of the object included in the captured image data. If the receiving unit 450b receives an instruction to extract the outline, the receiving unit 450b outputs a control signal to the extraction unit 450c.

The extraction unit 450c is a processing unit that extracts, when receiving the control signal from the receiving unit 450b, the outline of the object included in the captured image data. In the second embodiment, as an example, a process in which the extraction unit 450c extracts the outline of the object 11a performed based on the encoding file F2 will be described.

For example, the extraction unit 450c generates the extraction image data 70 and divides the extraction image data 70 into the plurality of the blocks 70-11 to 70-45. It is assumed that the number of the blocks 70-11 to 70-45 is the same as the number of the blocks 60-11 to 60-45 in the captured image data 60 described in FIG. 11.

The extraction unit 450c sequentially scans the area assigned for the superimposition information in the trailer portion in the encoding file F2 and specifies the codes other than the code "δ61" that is associated with the superimposition information in which all of the areas are "0". The extraction unit 450c specifies, from the blocks 70-11 to 70-45, the blocks that include the outline of the object 11a by using the order in which the specified cods were stored as a key. For example, it is assumed that the order in which the superimposition information is stored in the area is the order of 2, 5, 6, 7, 9, 13, 16, 17, and 18 and it is assumed that the each of the blocks has sequentially been encoded in the order described in FIG. 2. If so, the blocks that include the outline of the object 11a corresponds to the blocks 70-12, 70-13, 70-14, 70-22, 70-24, 70-32, 70-34, 70-43, and 70-44 described in FIG. 13.

Furthermore, the extraction unit 450c refers to the superimposition management information 340d stored in the trailer portion and sets the outline includes in each of the blocks based on the boundary portion of "0" and "1" indicated by the superimposition information associated with the specified codes. For example, the extraction unit 450c sets the outline (boundary) associated with the order of 2, 5, 6, 7, 9, 13, 16, 17, and 18 to the outlines 80-12, 80-13, 80-14, 80-22, 80-24, 80-32, 80-34, 80-43, and 80-44, respectively described in FIG. 13.

The extraction unit 450c extracts the outline that is a combination of the set outlines 80-12, 80-13, 80-14, 80-22, 80-24, 80-32, 80-34, 80-43, and 80-44 as the outline vector of the object 11a.

The generating unit 450d is a processing unit that generates PostScript data based on the information on the outline vector. The process of generating the PostScript data performed by the generating unit 450d corresponds to the process of generating the PostScript data performed by the generating unit 250d described in the first embodiment. The generating unit 450d may also store the generated PostScript data in the storage unit 240 or may also output the generated PostScript data to an external device. Furthermore, the generating unit 450d may also store the PostScript data 95 in the trailer portion in the encoding file F1 in the same way as that performed by the generating unit 250d.

Figure 20:
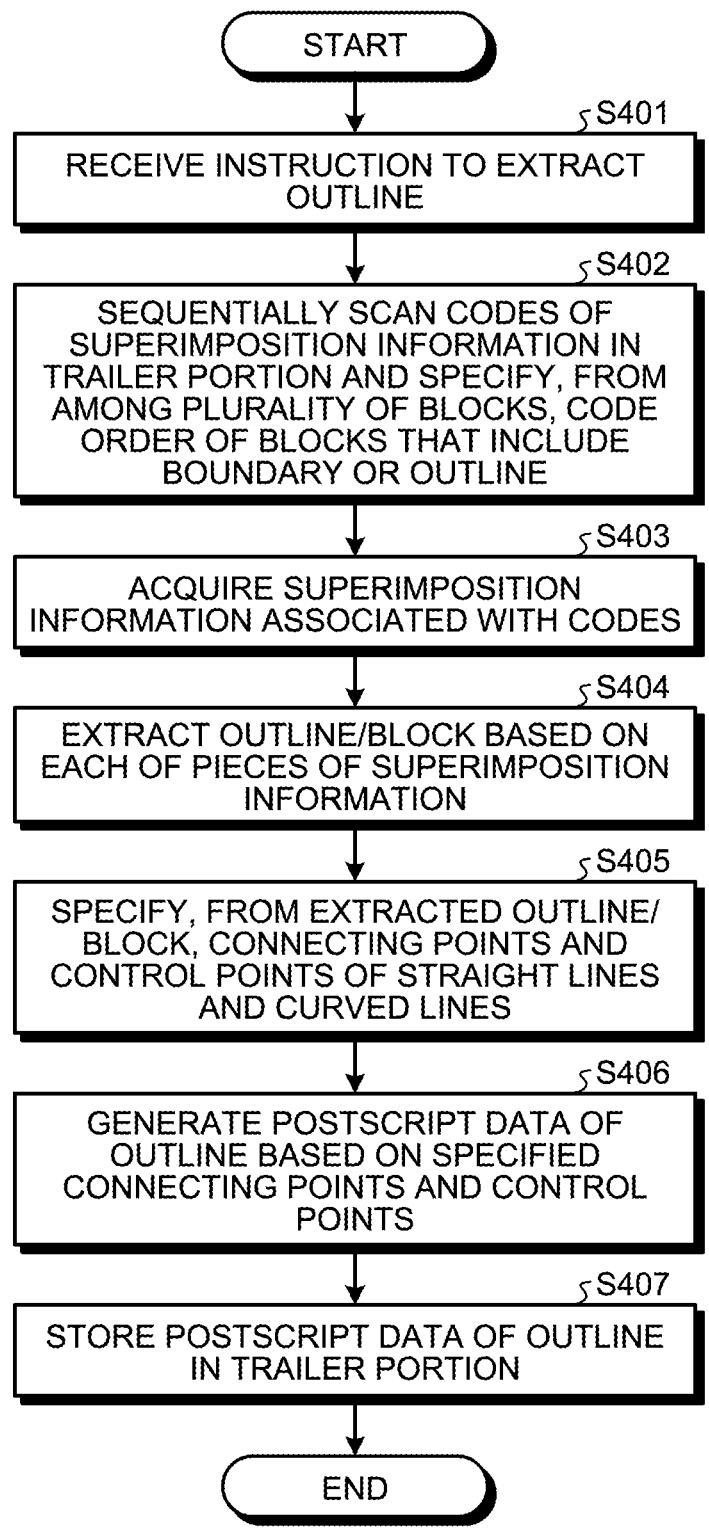
FIG. 20 is a flowchart illustrating the flow of a process performed by the extraction device according to the second embodiment.

In the following, an example of the flow of a process performed by the extraction device 400 according to the second embodiment will be described. FIG. 20 is a flowchart illustrating the flow of the process performed by the extraction device according to the second embodiment. As illustrated in FIG. 20, the receiving unit 450b in the extraction device 400 receives an instruction to extract the outline (Step S401).

The extraction unit 450c in the extraction device 400 sequentially scans the codes of the superimposition information in the trailer portion and specifies, from among the plurality of blocks, the order of the blocks that include the boundary or the outline (Step S402). The extraction unit 450c acquires the superimposition information associated with the codes (Step S403).

The extraction unit 450c extracts the outline/block (outline vector) based on each of the pieces of superimposition information (Step S404).

The generating unit 450d specifies, from the extracted outline/block, the connecting point and the control point between the straight line and the curved line (Step S405). The generating unit 450d generates the PostScript data of the outline based on the specified connecting point and the control point (Step S406). The generating unit 450d stores the PostScript data of the outline in the trailer portion (Step S407).

In the following, the effect of the storage control device 300 according to the second embodiment will be described. The storage control device 300 divides the captured image data 60 into a plurality of blocks; scans the blocks in a predetermined order; encodes each of the blocks; and sequentially stores the codes in the code area and the trailer portion in the encoding file F2 in the order in which the blocks were encoded. Here, the storage control device 300 performs a process of generating the superimposition information in which the areas of the object 11a included in the blocks are set to "1" and the other areas are set to "0", assigning the codes to the superimposition information, and storing the superimposition information in the trailer portion. Consequently, it is possible to specify the blocks that include the outline of the object by scanning the codes of the superimposition information stored in the trailer portion and it is possible to easily recycle the outline (outline vector) of the object by specifying the boundary of "1" and "0" indicated by superimposition information associated with the codes.

In the following, the effect of the extraction device 400 according to the second embodiment will be described. The extraction device 400 extracts the outline (outline vector) of the object by scanning the trailer portion, scanning the blocks that include the outline of the object, and acquiring the information on the boundary of "1" and "0" indicated by superimposition information associated with the specified blocks. In this process, it is possible to extract the outline of the object 11a without decoding the encoded information or performing edge detection performed by using the EM algorithm. Thus, with the extraction device 400, it is possible to easily specify the outline of the object included in the captured image data.

In the following, an example of a hardware configuration of a computer that implements the same function as that performed by the storage control devices 100 and 300 described above in the embodiments. FIG. 21 is a diagram illustrating an example of the hardware configuration of the computer that implements the same function as that performed by the storage control device.

As illustrated in FIG. 21, a computer 500 includes a CPU 501 that executes various kinds of arithmetic processing, an input device 502 that receives an input of data from a user, and a display 503. Furthermore, the computer 500 includes a reading device 504 that reads programs or the like from a storage medium and an interface device 505 that sends and receives data to and from recording equipment via a wired or wireless network. Furthermore, the computer 500 includes a RAM 506 that temporarily stores therein various kinds of information and a hard disk device 507. Each of the devices 501 to 507 is connected to a bus 508.

The hard disk device 507 includes an acquiring program 507a, a generating program 507b, a specifying program 507c, an encoding program 407d, and an outputting program 507e. The CPU 501 reads each of the programs 507a to 507e and loads the programs in the RAM 506.

The acquiring program 507a functions as an acquiring process 506a. The generating program 507b functions as a generating process 506b. The specifying program 507c functions as a specifying process 506c. The encoding program 507d functions as an encoding process 506d. The outputting program 507e function is as an outputting process 506e.

The process of the acquiring process 506a corresponds to the process performed by the acquiring units 150a and 350a. The process of the generating process 506b corresponds to the process performed by the generating units 150b and 350b. The process of the specifying process 506c corresponds to the process performed by the specifying units 150c and 350c. The process of the encoding process 506d corresponds to the process performed by the encoding units 150d and 350d. The process of the outputting process 506e corresponds to the process performed by the output units 150e and 350e.

Furthermore, each of the programs 507a to 507e does not need to be stored in the hard disk device 507 in advance from the beginning. For example, each of the programs is stored in a "portable physical medium", such as a flexible disk (FD), a CD-ROM, a DVD disk, a magneto-optic disk, an IC CARD, that is to be inserted into the computer 500. Then, the computer 500 may also read each of the programs 507a to 507e from the portable physical medium and execute the programs.

In the following, an example of a hardware configuration of a computer that implements the same function as that performed by the extraction devices 200 and 400 described above in the embodiments. FIG. 22 is a diagram illustrating an example of the hardware configuration of a computer that implements the same function as that performed by the extraction device.

As illustrated in FIG. 22, a computer 600 includes a CPU 601 that executes various kinds of arithmetic processing, an input device 602 that receives an input of data from a user, and a display 603. Furthermore, the computer 600 includes a reading device 604 that reads programs or the like from a storage medium and an interface device 605 that sends and receives data to and from recording equipment via a wired or wireless network. Furthermore, the computer 600 includes a RAM 606 that temporarily stores therein various kinds of information and a hard disk device 607. Each of the devices 601 to 607 is connected to a bus 608.

The hard disk device 607 includes an acquiring program 607a, a receiving program 607b, an extraction program 607c, and a generating program 607d. The CPU 601 reads each of the programs 607a to 607c and loads the programs in the RAM 606.

The acquiring program 607a functions as an acquiring process 606a. The receiving program 607b functions as a receiving process 606b. The extraction program 607c functions as an extraction process 606c. The generating program 607d functions as a generating process 606d.

The process of the acquiring process 606a corresponds to the process performed by the acquiring units 250a and 450a. The process of the receiving process 606b corresponds to the process performed by the receiving units 250b and 450b. The process of the extraction process 606c corresponds to the process performed by the extraction units 250c and 450c. The process of the generating process 606d corresponds to the process performed by the generating units 250d and 450d.

Furthermore, each of the programs 607a to 607d does not need to be stored in the hard disk device 607 in advance from the beginning. For example, each of the programs is stored in a "portable physical medium", such as a flexible disk (FD), a CD-ROM, a DVD disk, a magneto-optic disk, an IC CARD, that is to be inserted into the computer 600. Then, the computer 600 may also read each of the programs 607a to 607d from the portable physical medium and execute the programs.

It is possible to easily generate information that is efficiently used to recycle the outline of an object included in a captured image. It is possible to easily specify the outline of the object included in the captured image.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control method comprising:
   receiving a captured image and association information associated with each of a plurality of blocks, the association information indicating whether a boundary between a first object and a second object is included in each of the plurality of blocks included in the captured image, wherein a distance from the first object to an image capturing position of the captured image is different from a distance from the second object to the image capturing position, using a processor;
   specifying the blocks in which the boundary is included from among the plurality of blocks based on the association information, using the processor;
   generating first image data that includes the first object but does not include the second object and that is associated with the specified blocks in which each of the specified blocks includes the boundary between the first object and the second object based on image data associated with the specified blocks included in the received captured image and
   second image data that includes the second object and that is associated with the specified blocks in which each of the specified blocks does not include the boundary between the first object and the second object based on image data associated with the specified blocks included in the received captured image, using the processor; and
   storing the first image data and the second image data in a storage unit so as to be identifiable, using the processor.

2. The storage control method according to claim 1, further comprising
   acquiring a first captured image captured by a first camera in a camera and a second captured image captured by a second camera in the camera, and
   generating the association information based on the first captured image and the second captured image.

3. The storage control method according to claim 1, wherein
   the generating selects the plurality of blocks in a predetermined order, generates the first image data and the second image data when the boundary is included in the selected blocks and generates third image data when the boundary is not included in the selected blocks, and the storage control method further comprising
   encoding the first image data and the second image data, or the third image data to each of identifiable codes, wherein
   the storing includes storing the codes in the storage unit in a predetermined order.

4. The storage control method according to claim 1, further comprising encoding the first image data and the second image data based on Zelkova tree information in which the first image data is associated with a code that is identified to be the first image data and the second image data is associated with a code that is identified to be the second image data.

5. The storage control method according to claim 1, further comprising
   generating superimposition information by assigning, for each of the specified blocks, in an area of the block, a first pixel value to an area of the first object and a second pixel value to an area other than the first object, assigning a unique code to the superimposition information that includes the first pixel value and the second pixel value, and assigning an identical code to each of the pieces of superimposition information that includes the second pixel value.

6. An extraction method comprising:
   receiving an instruction to extract an outline of an object included in a captured image, using a processor;
   referring to a storage unit that stores therein, a plurality of types and a plurality of pieces of image data respectively corresponding to a first type block and a second type block, wherein the plurality of pieces of image data are associated with a plurality of blocks included in the captured image, the first type block including a boundary between each of the objects and the second type block not including a boundary between each of the objects, using the processor;
   specifying one piece or a plurality of pieces of image data associated with a specific type from among the plurality of pieces of image data, using the processor; and
   extracting the outline of the object based on the specified one piece or the plurality of pieces of image data, using a processor.

7. The extraction method according to claim 6, further comprising
   separating the extracted outline into a straight line and a curved line,
   generating script information that indicates the shape of each of the straight line and the curved line, and
   storing the script information in the storage unit.

8. A storage control device comprising:
   a memory; and
   a processor that executes a process comprising:
   receiving a captured image and association information associated with each of a plurality of blocks, the association information indicating whether a boundary between a first object and a second object is included in each of the plurality of blocks included in the captured image, wherein a distance from the first object to an image capturing position of the captured image is different from a distance from the second object to the image capturing position;

specifying the blocks in which the boundary is included from among the plurality of blocks based on the association information;

generating first image data that includes the first object but does not include the second object and that is associated with the specified blocks in which each of the specified blocks includes the boundary between the first object and the second object based on image data associated with the specified blocks included in the received captured image and second image data that includes the second object and that is associated with the specified blocks in which each of the specified blocks does not include the boundary between the first object and the second object based on image data associated with the specified blocks included in the received captured image; and storing the first image data and the second image data in the memory so as to be identifiable.

9. The storage control device according to claim 8, the process further comprising acquiring a first captured image captured by a first camera in a camera and a second captured image captured by a second camera in the camera, and generating the association information based on the first captured image and the second captured image.

10. The storage control device according to claim 8 wherein the generating selects the plurality of blocks in a predetermined order, generates the first image data and the second image data when the boundary is included in the selected blocks and generates third image data when the boundary is not included in the selected blocks, and the process further comprising encoding the first image data and the second image data, or the third image data to each of identifiable codes, wherein the storing includes storing the codes in the memory in a predetermined order.

11. The storage control device according to claim 8, the process further comprising encoding the first image data and the second image data based on Zelkova tree information in which the first image data is associated with a code that is identified to be the first image data and the second image data is associated with a code that is identified to be the second image data.

12. The storage control device according to claim 8, the process further comprising generating superimposition information by assigning, for each of the specified blocks, in an area of the block, a first pixel value to an area of the first object and a second pixel value to an area other than the first object, assigning a unique code to the superimposition information that includes the first pixel value and the second pixel value, and assigning an identical code to each of the pieces of superimposition information that includes the second pixel value.

13. An extraction device comprising:

a memory that stores therein, a plurality of types and a plurality of pieces of image data respectively corresponding to the plurality of types, wherein the plurality of pieces of image data are associated with a plurality of blocks included in the captured image; and a processor that executes a process comprising:

receiving an instruction to extract an outline of an object included in a captured image;

referring to the memory;

specifying one piece or a plurality of pieces of image data associated with a specific type from among the plurality of pieces of image data respectively corresponding to a first type block and a second type block, wherein the plurality of pieces of image data are associated with a plurality of blocks included in the captured image, the first type block including a boundary between each of the objects and the second type block not including a boundary between each of the objects; and extracting the outline of the object based on the specified one piece or the plurality of pieces of image data.

14. The extraction device according to claim 13, further comprising separating the extracted outline into a straight line and a curved line, generating script information that indicates the shape of each of the straight line and the curved line, and storing the script information in the memory.

* * * * *